United States Patent
Martucci et al.

(10) Patent No.: US 9,659,320 B2
(45) Date of Patent: May 23, 2017

(54) SYSTEM AND METHOD TO ENABLE A CUSTOMER TO SELECT A WINE BASED UPON AVAILABLE INVENTORY

(76) Inventors: Jennifer Martucci, Muttontown, NY (US); Patrick Martucci, Muttontown, NY (US)

(*) Notice: Subject to any disclaimer, the term of this patent is extended or adjusted under 35 U.S.C. 154(b) by 210 days.

(21) Appl. No.: 13/547,427

(22) Filed: Jul. 12, 2012

(65) Prior Publication Data
US 2012/0284129 A1 Nov. 8, 2012

Related U.S. Application Data

(63) Continuation-in-part of application No. 13/181,385, filed on Jul. 12, 2011, and a continuation-in-part of application No. 12/399,734, filed on Mar. 6, 2009.

(60) Provisional application No. 61/363,548, filed on Jul. 12, 2010, provisional application No. 61/616,894, filed on Mar. 28, 2012, provisional application No. 61/099,757, filed on Sep. 24, 2008.

(51) Int. Cl.
G06Q 50/12 (2012.01)
G06Q 30/06 (2012.01)
G06Q 10/08 (2012.01)

(52) U.S. Cl.
CPC ....... *G06Q 30/0603* (2013.01); *G06Q 10/087* (2013.01); *G06Q 50/12* (2013.01)

(58) Field of Classification Search
CPC ..................................................... G06Q 50/12
USPC .... 705/15, 26.1, 26.3, 306, 16, 23, 26.5, 28; 455/405, 406, 414.1; 340/286.09, 573.1; 434/127; 706/46
See application file for complete search history.

(56) References Cited

U.S. PATENT DOCUMENTS

| | | | |
|---|---|---|---|
| 4,530,067 A | | 7/1985 | Dorr |
| 5,200,909 A | * | 4/1993 | Juergens .......................... 702/25 |
| 5,544,040 A | | 8/1996 | Gerbaulet |
| 5,710,887 A | * | 1/1998 | Chelliah et al. ........... 705/26.62 |
| 5,761,648 A | * | 6/1998 | Golden et al. ............. 705/14.36 |
| 5,822,737 A | * | 10/1998 | Ogram ........................ 705/14.4 |

(Continued)

OTHER PUBLICATIONS

Michael Gros, "Case Study: VAR Cooks Up E-Menu for Holiday Inn," retrieved from the internet, Sep. 17, 2004 http://www.crn.com/networking/47212335; 2 pages.

(Continued)

*Primary Examiner* — Andrew Joseph Rudy
(74) *Attorney, Agent, or Firm* — Howison & Arnott, LLP

(57) ABSTRACT

A method is disclosed for providing services to a patron of an establishment by providing to the patron a handheld device upon entering the establishment. The patron is identified such that the patron is associated with the handheld device provided thereto and the operation thereof. The patron is presented with available services of the establishment and, in association with the available services, parameterized information from a database is presented to the patron relating to prior actual experiences with at least one of the services as rated by the patron, which rating defines how the patron viewed the services at the time of such providing. The patron selects from the provided information one or more of the available services. As part of the parameterized information, prior selected and not yet rated services are also presented. The patron rates the prior selected and not yet rated services and the database is updated.

15 Claims, 35 Drawing Sheets

(56) References Cited

U.S. PATENT DOCUMENTS

| | | | |
|---|---|---|---|
| 5,839,115 A | 11/1998 | Coleman | |
| 5,845,263 A * | 12/1998 | Camaisa et al. | 705/15 |
| 5,946,660 A * | 8/1999 | McCarty et al. | 705/5 |
| 6,356,874 B1 | 3/2002 | Ohrn | |
| 6,384,850 B1 | 5/2002 | McNally et al. | |
| 6,634,835 B1 | 10/2003 | Smith | |
| 6,636,835 B2 * | 10/2003 | Ragsdale-Elliott et al. | 705/15 |
| 6,819,976 B2 | 11/2004 | Kimura | |
| 6,842,719 B1 * | 1/2005 | Fitzpatrick et al. | 702/182 |
| 6,873,970 B2 * | 3/2005 | Showghi et al. | 705/15 |
| 6,880,750 B2 * | 4/2005 | Pentel | 235/380 |
| 7,022,017 B1 | 4/2006 | Halbritter et al. | |
| 7,069,228 B1 | 6/2006 | Rose | |
| 7,090,638 B2 * | 8/2006 | Vidgen | 600/300 |
| 7,092,892 B1 | 8/2006 | Sobalvarro et al. | |
| 7,110,958 B2 * | 9/2006 | Yang | 705/7.26 |
| 7,114,146 B2 | 9/2006 | Zhang et al. | |
| 7,454,370 B2 | 11/2008 | Baril et al. | |
| 7,505,929 B2 * | 3/2009 | Angert et al. | 705/26.3 |
| 7,606,732 B2 * | 10/2009 | Raghunathan et al. | 705/15 |
| 7,628,325 B2 * | 12/2009 | McIntosh | 235/385 |
| 7,716,083 B1 * | 5/2010 | Stouvenot | 705/26.5 |
| 7,721,969 B2 | 5/2010 | Johnson | |
| 7,765,121 B2 * | 7/2010 | Pace | G06Q 10/0631 705/7.13 |
| 7,780,522 B2 * | 8/2010 | Lutnick et al. | 463/25 |
| 7,797,005 B2 * | 9/2010 | Inselberg | G06Q 30/0258 363/40 |
| 7,797,204 B2 * | 9/2010 | Balent | 705/28 |
| 7,835,946 B2 | 11/2010 | Goren | |
| 7,844,482 B1 * | 11/2010 | Larson | G06F 17/3087 705/7.31 |
| 7,938,727 B1 * | 5/2011 | Konkle | 463/42 |
| 7,945,477 B2 | 5/2011 | Werbitt | |
| 7,969,307 B2 * | 6/2011 | Peeters | A61B 5/0002 340/572.1 |
| 7,999,674 B2 | 8/2011 | Kamen | |
| 8,089,346 B2 * | 1/2012 | Sugurappa Angadi et al. | 340/286.09 |
| 8,150,739 B1 * | 4/2012 | Marggraff | G06Q 30/0601 705/26.1 |
| 8,185,448 B1 * | 5/2012 | Myslinski | G06Q 10/10 705/26.1 |
| 8,204,794 B1 * | 6/2012 | Peng et al. | 705/26.1 |
| 8,209,219 B2 | 6/2012 | Fitzpatrick et al. | |
| 8,239,285 B1 | 8/2012 | Marggraff et al. | |
| 8,250,187 B2 * | 8/2012 | Cacheria, III | G06Q 10/1057 705/16 |
| 8,271,365 B2 * | 9/2012 | Jung et al. | 705/35 |
| 8,285,638 B2 * | 10/2012 | Jung et al. | 705/39 |
| 8,294,581 B2 | 10/2012 | Kamen | |
| 8,359,310 B1 * | 1/2013 | Frank et al. | 707/724 |
| 8,364,545 B2 * | 1/2013 | Arsenault | 705/16 |
| 8,385,896 B2 * | 2/2013 | Proctor et al. | 455/414.3 |
| 8,719,112 B2 * | 5/2014 | Carpenter | G06Q 30/06 705/26.63 |
| 8,751,429 B2 * | 6/2014 | Dillon | G06N 5/02 706/46 |
| 8,799,083 B1 * | 8/2014 | Silver | G06Q 10/02 705/26.1 |
| 8,844,800 B2 * | 9/2014 | Sahuguet | 235/375 |
| 8,855,620 B2 * | 10/2014 | Sievers | G06F 8/65 455/419 |
| 8,920,175 B2 * | 12/2014 | Black et al. | 434/127 |
| 8,934,406 B2 * | 1/2015 | Robertson | G06Q 30/02 370/328 |
| 9,067,150 B2 * | 6/2015 | Konkle | A63J 25/00 |
| 9,135,612 B1 * | 9/2015 | Proctor, Jr. | G06Q 20/202 |
| 9,430,786 B2 * | 8/2016 | Khan | G06Q 30/06 |
| 9,470,699 B2 * | 10/2016 | Peeters | A61B 5/0002 |
| 2002/0111899 A1 | 8/2002 | Veltre | |
| 2002/0133418 A1 | 9/2002 | Hammond | |
| 2002/0188495 A1 | 12/2002 | Banerjee et al. | |
| 2003/0083889 A1 | 5/2003 | Macklin | |
| 2003/0216970 A1 | 11/2003 | Vadjinia | |
| 2004/0059815 A1 | 3/2004 | Buckingham | |
| 2004/0075679 A1 | 4/2004 | Carter | |
| 2004/0158494 A1 | 8/2004 | Suthar | |
| 2006/0179055 A1 | 8/2006 | Grinsfelder | |
| 2007/0038727 A1 | 2/2007 | Bailey | |
| 2007/0050197 A1 | 3/2007 | Efron et al. | |
| 2008/0103917 A1 | 5/2008 | Lauderdale | |
| 2008/0141297 A1 | 6/2008 | Dawson | |
| 2008/0275761 A1 | 11/2008 | Seifer | |
| 2009/0210321 A1 | 8/2009 | Rapp | |
| 2011/0131084 A1 | 6/2011 | Shanahan | |
| 2011/0231266 A1 | 9/2011 | Baril | |
| 2011/0288919 A1 | 11/2011 | Gross | |
| 2012/0041847 A1 | 2/2012 | Caeiro | |

OTHER PUBLICATIONS

Gaylord Palms Resort & Convention Center, "Gaylord iConnect In-Room Computing System to Revolutionize Hotel Experience," News Release, 2008; 3 pages.

* cited by examiner

Italy

You may sort the wine results by touching one of the criteria at the right.

| | | Sort results by |
|---|---|---|
| La Versa, Pinot Noir Pavia Igt, Lombardy, Italy, 2007 | $35 #21793 | Fontanavecchia, Aglianico del Tabumo Doc, Campania, Italy, 2005 | $43 #B037 | (abc) — 522 Name |
| Principi di Butera, Syrah Sicilia Igt, Sicily, Italy, 2006 | $37 #21912 | La Mozza, I Perazzi Morellino di Scansano Docg, Tuscany, Italy, 2007 | $43 #26262 | ($) — 524 Price |
| Rosa del Golfo Scaliere Negroamaro, Salento Igt, Apulia, Italy, 2008 | $37 #B024 | Frecciarossa, Uva Rara, Pavia Igt, Lombardy, Italy, 2006 | $44 #25271 | (20/05) — 526 Vintage |
| Ca' Bolani, Refosco dal Peduncolo Rosso, Friuli Aquileia Doc, Friuli, Italy, 2006 | $40 #25082 | Tormaresca, Neprica, Puglia Igt, Apulia, Italy, 2008 | $44 #21987 | |
| Tenuta La Zolla, Barbera d'Alba Superiore Doc, Piedmont, Italy, 2006 | $42 #21795 | Librandi, Duca Sanfelice Ciro' Doc Riserva, Calabria, Italy, 2005 | $45 #8852 | |

[ back ] [ new search ] [ view selects ] ●○○○○○○○○○ [ next page ] — 528

*FIG. 5E*

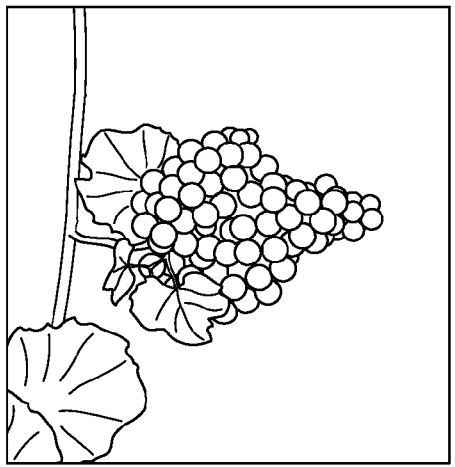

Refosco

Refosco is an Italian family of dark-skinned grape varieties native to the northern Italian areas of Friuli, Gavi, and Trentino. Refosco is also grown in Slovenian, and Croatian parts of Istria, under the name of Refosk, or Teran, respectively. The grape is also known as Terlan or Terlano.

The wines this grape yields can be quite powerful and tannic, with a deep violet color and a slight bitterness. On the palate, there is strong currant, wild berry, and plum. The wine can stand some aging, and after a period of four-to-ten years, it achieves a

[back] [new search] [view selects] [scroll down] [scroll up]

*FIG. 5G*

Ca'Bolani, Refosco dal Peduncolo Rosso, Friuli Aquileia Doc, Friuli 2006

TENUTA
CA'BOLANI

REFOSCO

Aquileia

| Country: Italy | Bin #:25082 | more info |
| Varietal: Refosco | | more info |
| Producer: Ca' Bolani | | more info |
| Region: Friuli Venezia Giulia | | more info |
| Appellation: Friuli Aquileia DOC | | |
| Price: $40 | | more info | back to list  new search  add to selects  view selects

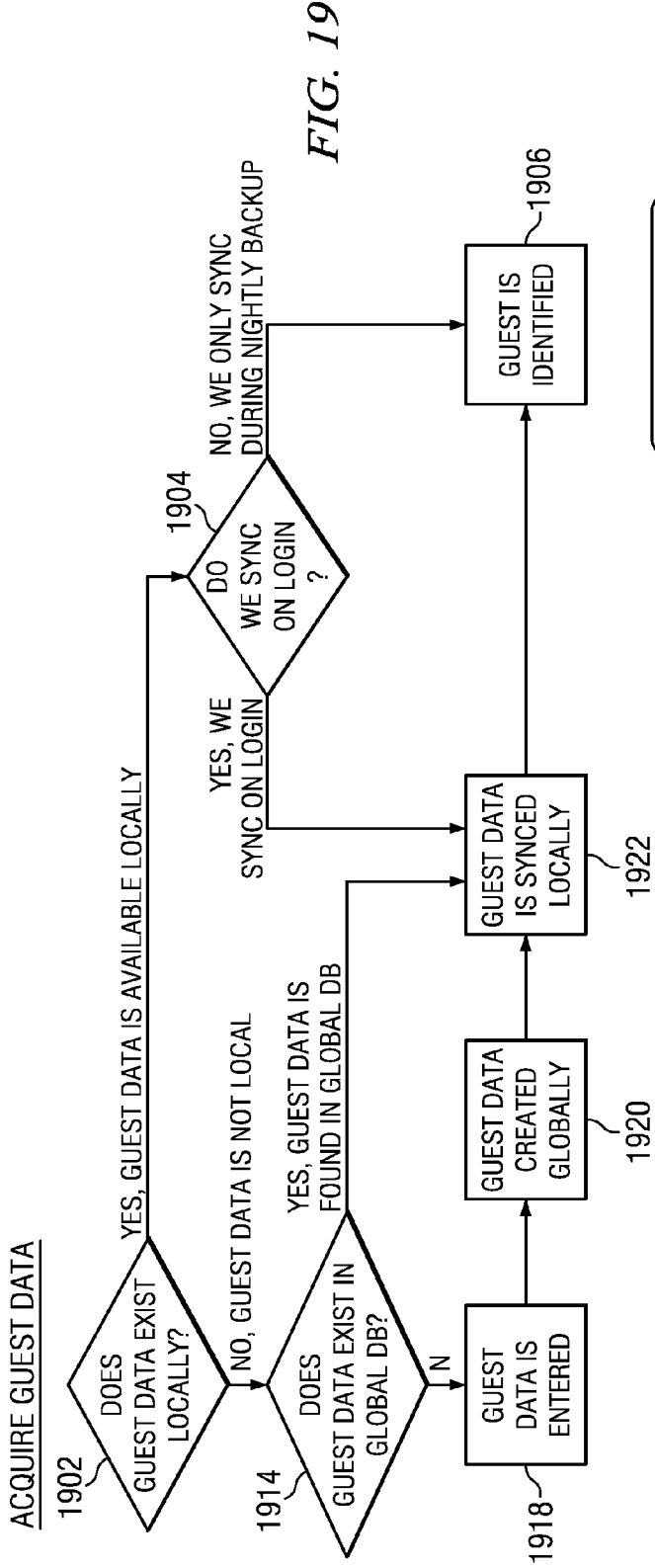
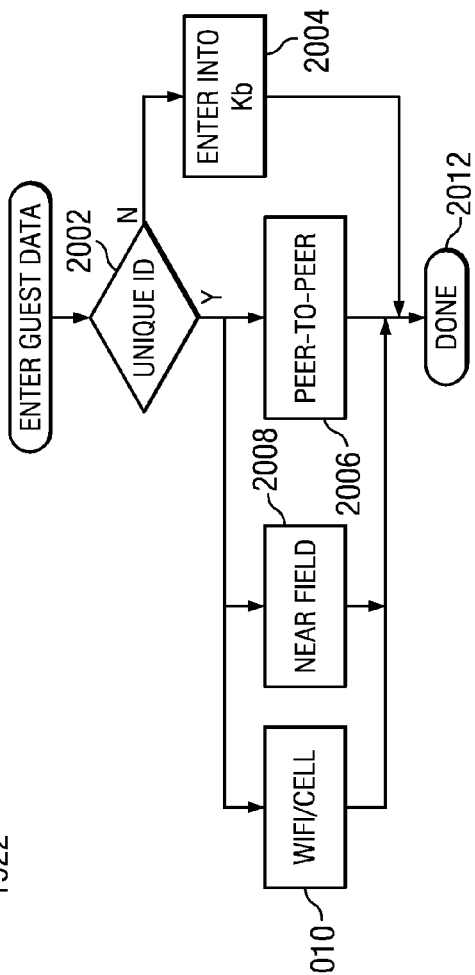
FIG. 19
FIG. 20

ORRERY

WELCOME BACK, PATRICK MARTIN!
YOUR D&D EXPERIENCE.

▽ ⌂ ▣ ▷ ◯ ⬅
OUR SOMMELIER SELECTION

| DATE | RESTAURANT | WINE | RATING | IN STOCK? | FOR YOUR ORDER TONIGHT |
|---|---|---|---|---|---|
| 23 01 12 | Le Pont de la Tour | 2006 St-Emilion Grand Cru, Chat, Valandraud, Bordeaux, France | ☝ | Yes | ADD TO BASKET<br>SEE SIMILAR WINES |
| 02 12 11 | Blueprint Cafe | 2009 Le Verrane, Barbera Monferrato, Piemonte, Italy | ☝ | Yes | ADD TO BASKET<br>SEE SIMILAR WINES |
| 13 10 11 | Quaglino's | 2002 Cab. Sauvignon, Anakota, Sonoma, California, USA | ☝ | No | SEE SIMILAR WINES |
| 12 08 11 | Plateau | 2010 Cab. Sauvignon, Costa Vera, Maipo Valley, Chile | ☝ 2602 | No | SEE SIMILAR WINES |
| 15 07 11 | Carom | 2009 Sauvignon Blanc, Grover Vinyards, Nandi Hills, India | ☝ | Yes | MAY WE RECOMMEND SOMETHING ELSE? |
| 05 07 11 | Sauterelle | 2005 Pauillac, Chateau Haut-Bages Averous, Bordeaux, France | ☝ | Yes | ADD TO BASKET<br>SEE SIMILAR WINES |
|  |  | 2007 Chateauneuf-du-Pape, Southern Rhone, France | ☝ | Yes | MAY WE RECOMMEND SOMETHING ELSE? |
| 21 06 11 | Coq a'Argent | 2005 Saumur Blanc, | ☝ | Yes | ADD TO BASKET |

Wine by the bottle
Wine by the glass
Cocktails
Beer
Soft drinks
Seasonal truffle menu
Other D&D locations
Magazine       2604
Shop

SIGN UP FOR OUR NEWSLETTER smarttouch                    D&D LONDON

*FIG. 26*

SYSTEM AND METHOD TO ENABLE A CUSTOMER TO SELECT A WINE BASED UPON AVAILABLE INVENTORY

CROSS-REFERENCE TO RELATED APPLICATIONS

This application is a continuation-in-part of U.S. patent application Ser. No. 13/181,385, filed Jul. 12, 2011, entitled SYSTEM AND METHOD TO ENABLE A CUSTOMER TO SELECT A WINE BASED UPON AVAILABLE INVENTORY, which claims benefit of U.S. Provisional Application No. 61/363,548, filed Jul. 12, 2010, entitled SYSTEM AND METHOD TO ENABLE A CUSTOMER TO SELECT A WINE BASED UPON AVAILABLE INVENTORY, the specifications of which are incorporated herein by reference.

This application also claims benefit of U.S. Provisional Application No. 61/616,894, filed Mar. 28, 2012, entitled SYSTEM AND METHOD TO ENABLE A CUSTOMER TO SELECT A WINE BASED UPON AVAILABLE INVENTORY This application is also a continuation-in-part of U.S. patent application Ser. No. 12/399,734, filed Mar. 6, 2009, entitled METHOD FOR PROVIDING ROOM SERVICE which claims benefit of U.S. Provisional Application No. 61/099,757, filed Sep. 24, 2008, entitled SYSTEM AND METHOD FOR PROVIDING ROOM SERVICE, the specifications of which are incorporated herein by reference.

TECHNICAL FIELD

The disclosure relates to a system and method for aiding patrons of establishments such as restaurants in selecting wines and drinks and for collecting information regarding such selections.

BACKGROUND

Restaurants and similar establishments, in particular more exclusive restaurants, that serve wine present their patrons with wine lists from which the patrons select a wine or wines to accompany their meals. Such wine lists vary from plastic laminated sheets to heavy leather bound volumes and often contain limited information regarding the individual listed wines. Such wine lists do not reflect the restaurant wine cellar's inventory of a particular wine at a particular time. Further, changing such wine lists may require reprinting and replacing pages of the list, a time consuming and potentially expensive process.

SUMMARY

The present invention disclosed and claimed herein comprises a method for providing services to a given patron of an establishment by first providing to the given patron a handheld device upon entering the establishment. Then, the patron is identified such that the given patron is associated with the handheld device provided thereto and with the operation thereof. The given patron is presented with available services of the establishment and, in association with the available services, parameterized information from a database is presented to the given patron relating to prior actual experiences with at least one of the services of the establishment as rated by the given patron, which rating defines how the given patron viewed the services provide by the establishment at the time of such providing. The given patron then selects from the provided information one or more of the available services. As part of the parameterized information, prior selected services not yet rated are also presented. The patron then rates the prior selected and not yet rated services and then the database is updated.

BRIEF DESCRIPTION OF THE DRAWINGS

For a more complete understanding, reference is now made to the following description taken in conjunction with the accompanying Drawings in which:

FIGS. 5A through 5J are a series of screens that may be displayed on patron display and selection device to aid a patron in making wine selections;

FIG. 19 illustrates a flow chart for acquiring guest or patron data;

FIG. 20 illustrates a flow chart for entering the guest or patron data;

FIGS. 23-27 illustrate screen shots for the use of the tablet or patron display device.

DETAILED DESCRIPTION

Figure 1A:
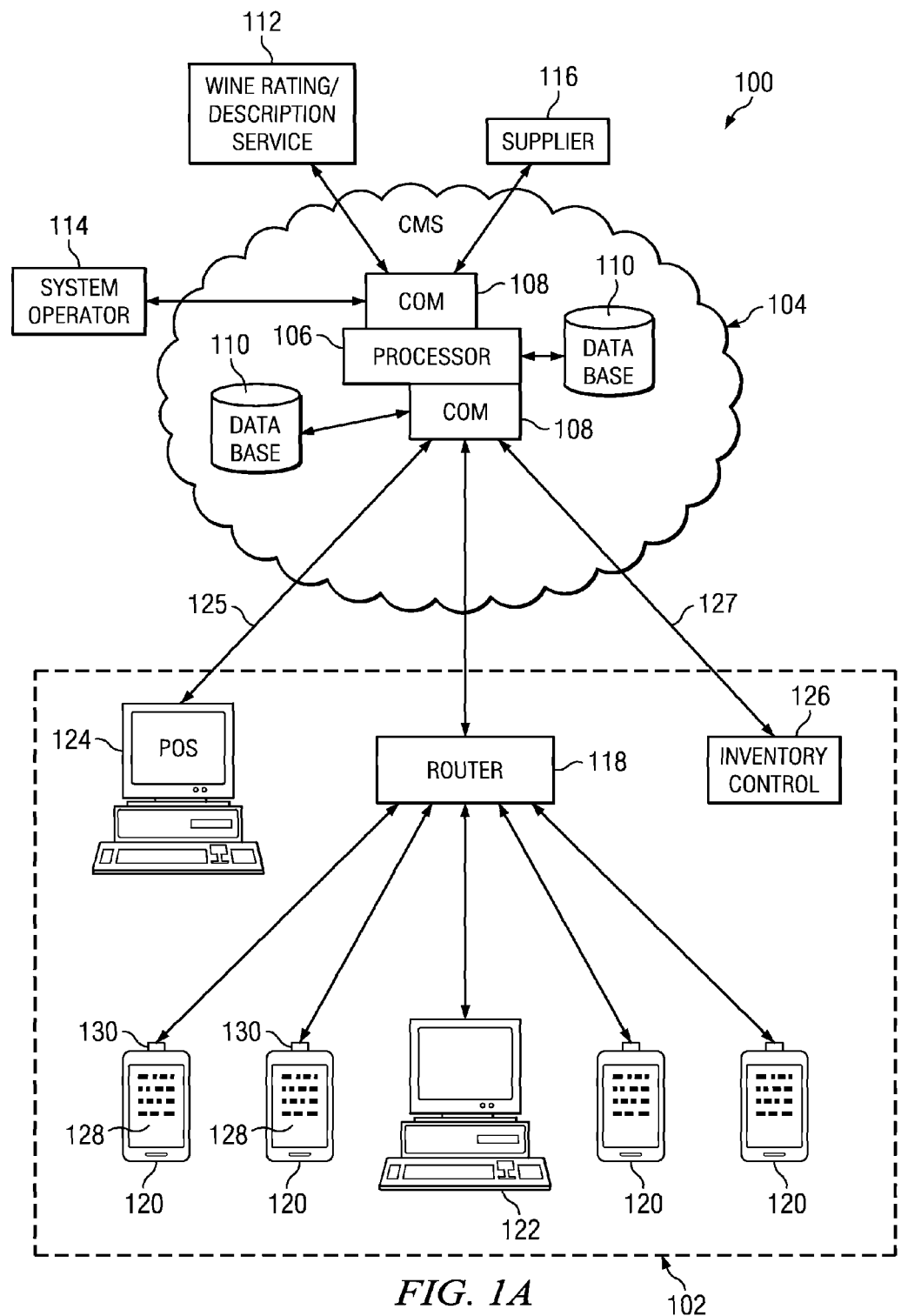
FIG. 1A is a diagrammatic representation of a system 100 to aid and enable a customer to select a wine.

Referring now to the drawings, wherein like reference numbers are used herein to designate like elements throughout, the various views and embodiments of a system and method to enable a customer to select a wine based upon available inventory are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

FIG. 1A is a diagrammatic representation of a system 100 to aid and enable a customer to select a wine. System 100 is particularly suitable for use in restaurants and similar establishments that serve wine with meals or food. System 100 includes a content management system 104 adapted to service one or more restaurants 102 or similar establishments. In one embodiment, content management system 104 includes one or more processors 106 having data communications interfaces 108. Communications interfaces 108 may be wired, wireless, or a combination of wired and wireless interfaces. Interfaces 108 enable content management system 104 to communicate with, for example wine reading and/or description service 112, wine suppliers 116 and a system operator 114 that maintains the content management system. Also associated with content management system 104 are databases 110 that may be used to store a variety of information relating to wines that may be provided to patrons of restaurant 102. As will be appreciated, content management system 104 may be real, i.e., embodied in a single dedicated processor and associated databases or virtual in which case the content management system may incorporate a number of processors and databases located at different locations that are linked via a private or public network such as the internet.

In one embodiment, system 100 employs a plurality of patron display devices 120 that may be presented to and used by patrons of restaurant 102 in order to select and/or order wines available in inventory at the restaurant. Patron display devices 120 may be small, portable devices incorporating a graphical user interface such as touch screen display 128 and a wireless communications interface 130. In other embodiments, patron display devices 120 may include a wired or wireless communications interface and be permanently affixed to tables or other fixtures in restaurant 102 at locations convenient to patrons of the restaurant.

Patron display device may be personalized for a select patron based on that patron having a user profile in the database and being identified upon entering an establishment and gaining access to a patron display device.

Patron display devices 120 communicate with content management system 104 via a router 118 which may be located in, or in close proximity to, restaurant 102 to facilitate wireless communications between the patron display device and the router. Router 118 enables communications and data transfer between patron display devices 120 and content management system 104. Typically, patron display devices 120 will be dedicated, preprogrammed "thin clients" i.e., the patron display devices will be provided with a touch screen display, a communication interface and sufficient processing power to receive and transmit information back and forth to content management system 104 and to display various screens to patrons.

Referring still to FIG. 1A, an administrative workstation 122 may also be provided to enable employees of restaurant 102 to communicate with content management system 104 via router 118 to perform administrative functions. Such functions may include report generation, adding or detecting wines from database 110 of content management system 104, access control and similar functions. Content management system 104 may also communicate with a point of sale system 124 of restaurant 102 via a wired or wireless communications link 125 to enable a patron to place an order for wine directly from a patron display device 120 and to facilitate record keeping for the transaction. This feature may eliminate the need for a sommelier or waiter to take and process an order for the wine or wines selected by the patron using a point of sale system. Content management system 104 may also communicate with an inventory control system 126 of restaurant 102 via a wired or wireless communications link 127 to enable content management system 104 to maintain an accurate record of wines available in restaurant 102 and to facilitate restocking and inventory record keeping.

In one embodiment, system 100 may be owned and operated by a third party system operator 114. In this case, a system operator 114 may own, operate and maintain content management system 104 and the associated components of system 100. This arrangement alleviates the need for a capital investment by the owner or operator of restaurant 102 along with the associated time and expense involved in maintaining system 100. As will be appreciated, where system 100 is owned and/or operated by a third party system operator 114 a single content management system 104 may be configured to service multiple restaurants or similar establishments at different locations.

Figure 1B:
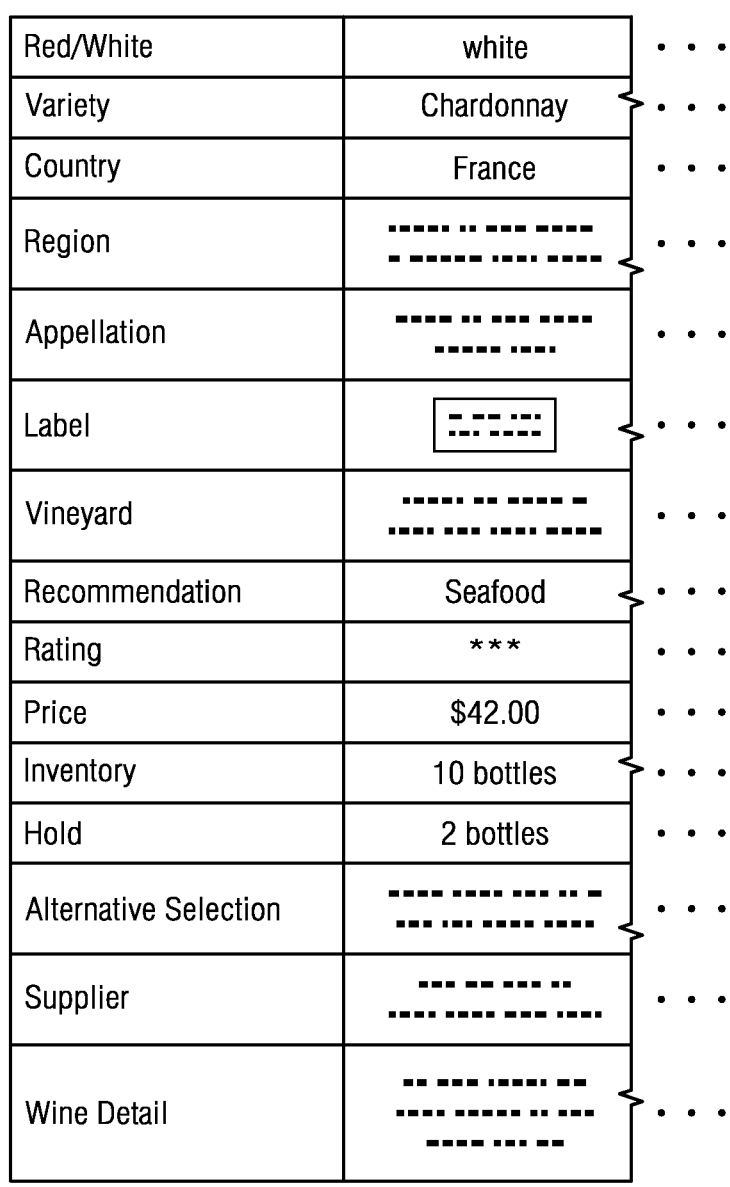
FIG. 1B is a simplified representation of a database that may be employed by content to facilitate wine selections according to the system and method described herein.

FIG. 1B is a simplified representation of a database that may be employed by content management system 104 in order to facilitate wine selections by patrons of the restaurant 102. As illustrated, the database may include wine classification by red or white, variety, country, region and appellation. Other information that may be incorporated into the database includes photos or representations of the label(s) placed on wine bottles, the particular vineyard or information relating to the vineyard from which the wine was produced, and recommendations, i.e., whether a particular wine is recommended in combination with seafood or red meat. Other information that may be incorporated into the database may include a rating for different wines, the price of different wines, the inventory of a particular wine in the restaurant's stock and whether all or any of the inventory is on hold for a patron. Further, recommendations can be provided based on recent customers. Even further, a particular patron's prior dining experiences can be stored for later retrieval by that patron, which dining experience is at that particular establishment, a related establishment or any establishment.

Alternative wine selections may be incorporated into the database for use when a particular wine is unavailable in inventory. The wine producer, supplier and/or vendor along with other details relating to a wine may also be incorporated into the database. It will be appreciated that the representation presented in FIG. 1B is exemplary only. In different variations, a plurality of relational databases may be employed to store and provide information relating to different wines that may be stocked by restaurant 102. Such relational databases may be keyed or linked by parameters such as wine type, country, region, price and other characteristics.

Figure 2:
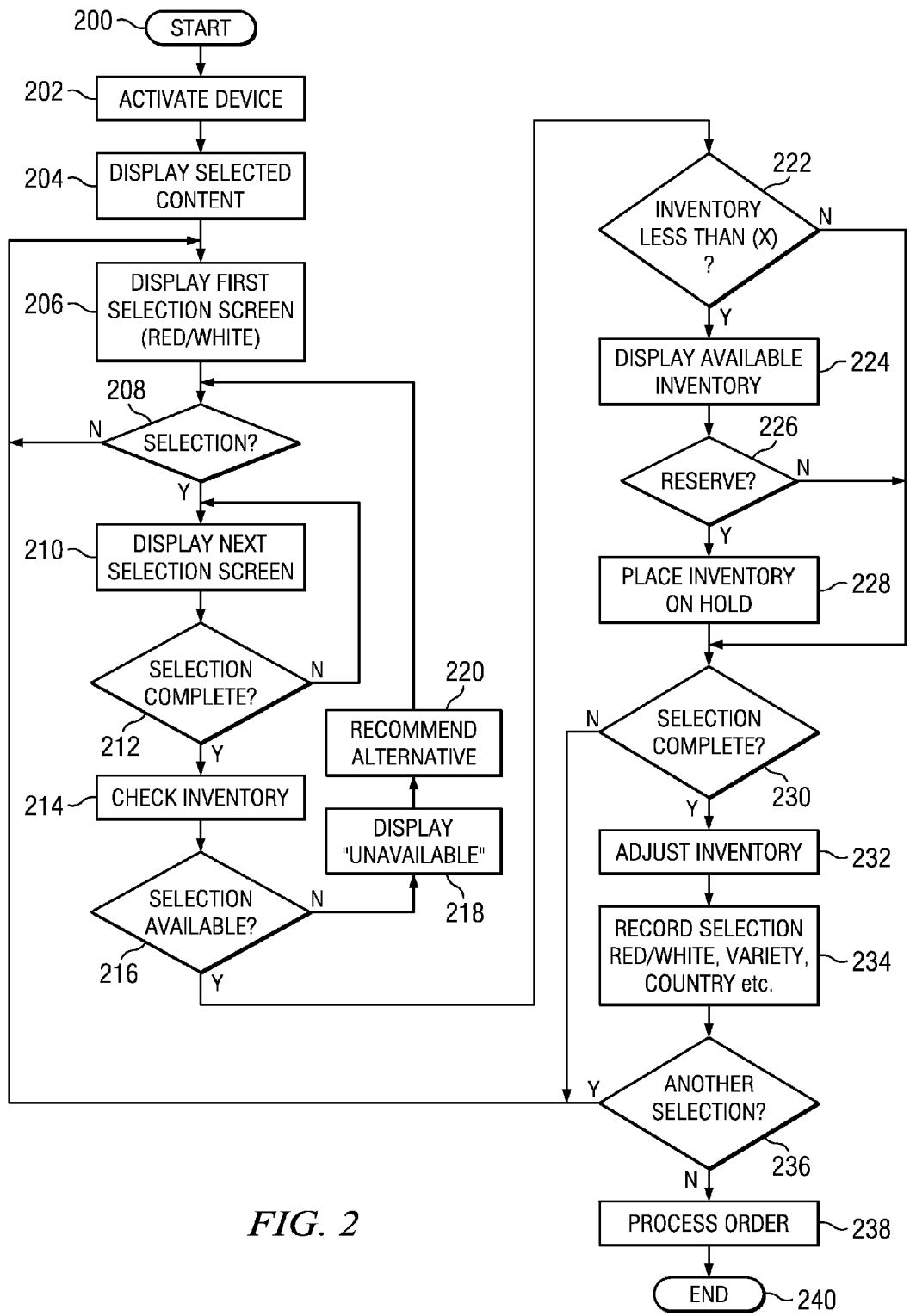
FIG. 2 is a flow chart illustrating a mode of operation of a wine selection and/or ordering system as described herein.

FIG. 2 is a flow chart illustrating a mode of operation of a wine selection and/or ordering system as described herein. The process begins at step 200 where a restaurant patron is presented with a patron display device 120 (FIG. 1A). At step 202 the patron activates the device which displays selected content at step 204. The selected content may be promotional materials for the particular establishment, for particular drinks and dishes served by the restaurant or related goods or services. In some embodiments, the content displayed at step 204 may comprise third party promotional materials, for example advertisements for theater tickets or similar events. The selected content may be displayed for a predetermined period of time, for example 10 or 15 seconds after which a first selection screen is displayed on patron display device 120 at step 206. An exemplary first selection screen is illustrated in FIG. 5B. It will be appreciated that the various selection screens and content presented on patron display device 120 may not be stored on the patron display device but rather are transmitted from content management system 104 to the patron display devices in response to patron input.

Referring still to FIG. 2, the restaurant patron is prompted at step 206 to make an initial selection, for example a red wine versus a white wine. In one embodiment, the patron may be presented with a selection screen including a choice of searching for wine by the bottle versus wine by the glass. At decision block 208 the restaurant patron may make a selection, for example between a red wine and a white wine. If the patron does not make a selection, the process loops back and continues to display the first selection screen. Assuming that the patron makes a selection at decision block 208, a second or subsequent selection screen may be displayed at step 210. For example, if the patron has selected a red wine, the display may include countries of origin, varieties and/or various red wines available in the restaurant's wine cellar. At decision block 212 it is determined whether the patron has completed a selection. If not, the process loops back to step 210 where a subsequent selection screen is displayed. This subsequent selection screen is typically based upon a patron's response to prior selection screens. For example, if a patron identifies a country or region of origin in response to a prior selection screen, the subsequent selection screen may identify wines originally from that country or region. During the process, a plurality of sequential selection screens may be displayed to the customer to aid in his or her selection. For example, selection screens enabling the patron to choose between countries of origin, regions, varieties, etc. may be sequentially displayed until the patron has narrowed his or her selection to a particular wine.

If the selection process is complete at step 212, the restaurant's inventory of the selected wine may be checked at step 214. In some embodiments, wines that have been depleted from the restaurant's inventory will not be displayed for selection. Likewise, if the available inventory of a particular wine has been placed on hold by one or more patrons, those wines will not be displayed for selection. This feature may prevent dissatisfaction or frustration on the part of patrons who proceed through the selection process only to find that their selection is unavailable.

At decision block 216, the availability of the selected wine may be determined. If the wine is unavailable, a display may be presented on patron display device 120 at step 218 indicating that the wine is not available. If the wine is unavailable, in one variation, an alternate selection may be displayed to the patron at step 220 after which the process returns to step 208 to facilitate selection of a different wine.

At step 222 the inventory of the selected wine, for example the number of bottles available in the restaurant's wine cellar, is compared to a predetermined value (x), for example four, six or ten bottles. This feature enables a patron who may wish to order multiple bottles of a particular wine to determine whether the desired number of bottles are available. If the number of available bottles is less than the predetermined number at step 224 the available number of bottles may be displayed to the patron. The patron may be given the option at step 226 to reserve some or all of the bottles remaining in the restaurant's inventory. If the patron elects to reserve one or more bottles of the available inventory, that number of bottles may be placed on hold at step 228. If the desired number of bottles is not available, the patron may return to block 206 to re-initiate the selection process.

Thus, a patron with a party that anticipates consuming, for example, four bottles of wine over the course of a dinner may place four bottles of the selected wine on hold for delivery to the patron's table as requested. At step 230, the patron is prompted to indicate whether his or her selection has been completed. If the patron's selection has not been completed, i.e., the patron wishes to change his or her selection or order one or more bottles of a different type of wine, the process loops back to step 210 whereat another selection screen is displayed to the patron. At step 232 the inventory of the selected wine or wines is adjusted in the database of content management system 104. Further, just the act of ordering a single bottle of wine by a patron greater than four, for example, may result in an automatic hold on additional bottles of that wine. This can also be a function of known habits of a given patron.

In one embodiment, the inventory of wines available in restaurant's 102 wine cellar is adjusted serially and continuously on a real time basis as wines are ordered or placed on hold. Wines that are unavailable or where the available inventory has been placed on hold may be removed from the display screens presented to patrons in order to facilitate the selection process.

At step 234, different information regarding the selection process may be recorded and stored in a database 110 of content management system 104. Such information may include the wine selection, e.g., red wine versus white, the particular variety, the country, the price and any other additional information that may be useful for analysis. Such information may, for example, enable the owner or operator of restaurant 102 to identify trends in the consumption of different types of wines, identify trends in terms of the price point that patrons are willing to meet along with seasonal or other variations or changes in patrons' tastes and consumption patterns.

At step 236 the patron may be prompted a final time to determine if the patron wishes to make another selection. If so, the process loops back to step 206 where an initial selection screen is displayed. If the patron has selected all of the wine or wines that he or she wishes, the order is processed at step 238. In one embodiment, the patron may simply hand the patron display device to the sommelier who will place the order for delivery to the patron's table. In other variations, the patron may be prompted to press a "done," "order complete," "order now" or similar display and the order is transmitted from the patron display device 120 to content management system 104 which in turn transmits the order information to a point of sale device 124 for processing. After the order has been placed, the process ends at step 240.

Figure 3:
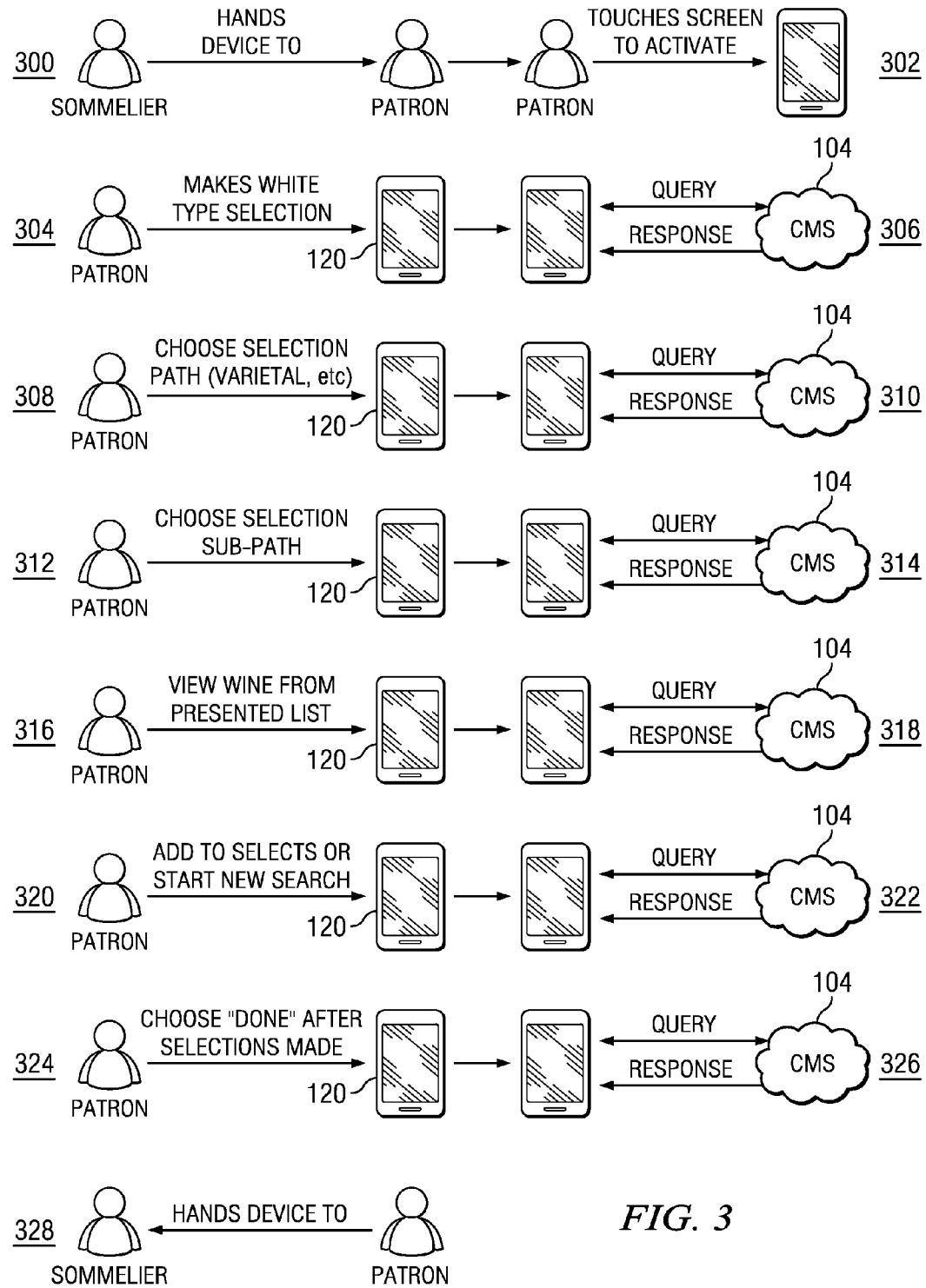
FIG. 3 is a diagrammatic representation of a one selection process as described herein.

FIG. 3 is a diagrammatic representation of a one selection process as described herein. The process begins at step 300 where the sommelier presents a restaurant patron with a patron display device 120 (FIG. 1) for use in making a wine selection. The patron may receive this as a result of having made a reservation, such that the patron will have been identified as the user of such device. At step 302 the patron touches the touch screen 128 of patron display device 120 to activate the device after which patron is presented with a selection screen prompting the patron to make an initial selection, for example, a red versus a white wine. In the illustrated embodiment, the patron makes a white wine selection at step 304 which is transmitted to content management system 104. Content management system 104 responds at step 306, transmitting a selection screen to the patron that prompts the patron to narrow or refine his or her search at step 308. For example, the patron may be allowed to select a country of origin or a particular variety of grape. The patron's response is transmitted to content management system 104 which may respond at step 310 with another selection screen prompting the patron to further narrow his or her search. The patron may be prompted to select a particular region, vineyard or other criteria defining a selection sub-path. At step 312, the patron selects a selection sub-path or criteria which is transmitted to content management system 104. It will be understood that this may be an iterative process wherein the patron sequentially identifies a number of criteria, narrowing his or her search during the selection process before making a final selection.

At step 314, the content management system 104 responds, transmitting a list of available wines corresponding to the criteria identified by the patron during the selection process. The patron may view the list of available wines at step 316 and make a selection from the list which is transmitted to content management system 104. Content management system 104 may transmit a screen at step 318 to patron selection device 120 prompting the patron to add a wine to his or her selection list or to start a new search. The patron may add a selected wine to his or her selection list at step 320 or elect to start a new search. The patron's response is transmitted to content management system 104 which may respond with a screen at step 322 including an option for the patron to indicate whether or not he or she has completed his or her selection or selections. The patron, at step 324, may select the "done" or "order complete" option which is transmitted to content management system 104. At step 324 content management system 104 may transmit a screen to patron display device 120 listing the wine or wines that the patron has selected. At step 326 the patron is prompted to return the patron display device 120 to the sommelier or waiter at step 328 with a list of selected wines after which the sommelier or waiter may process the patron's order.

Figure 4:
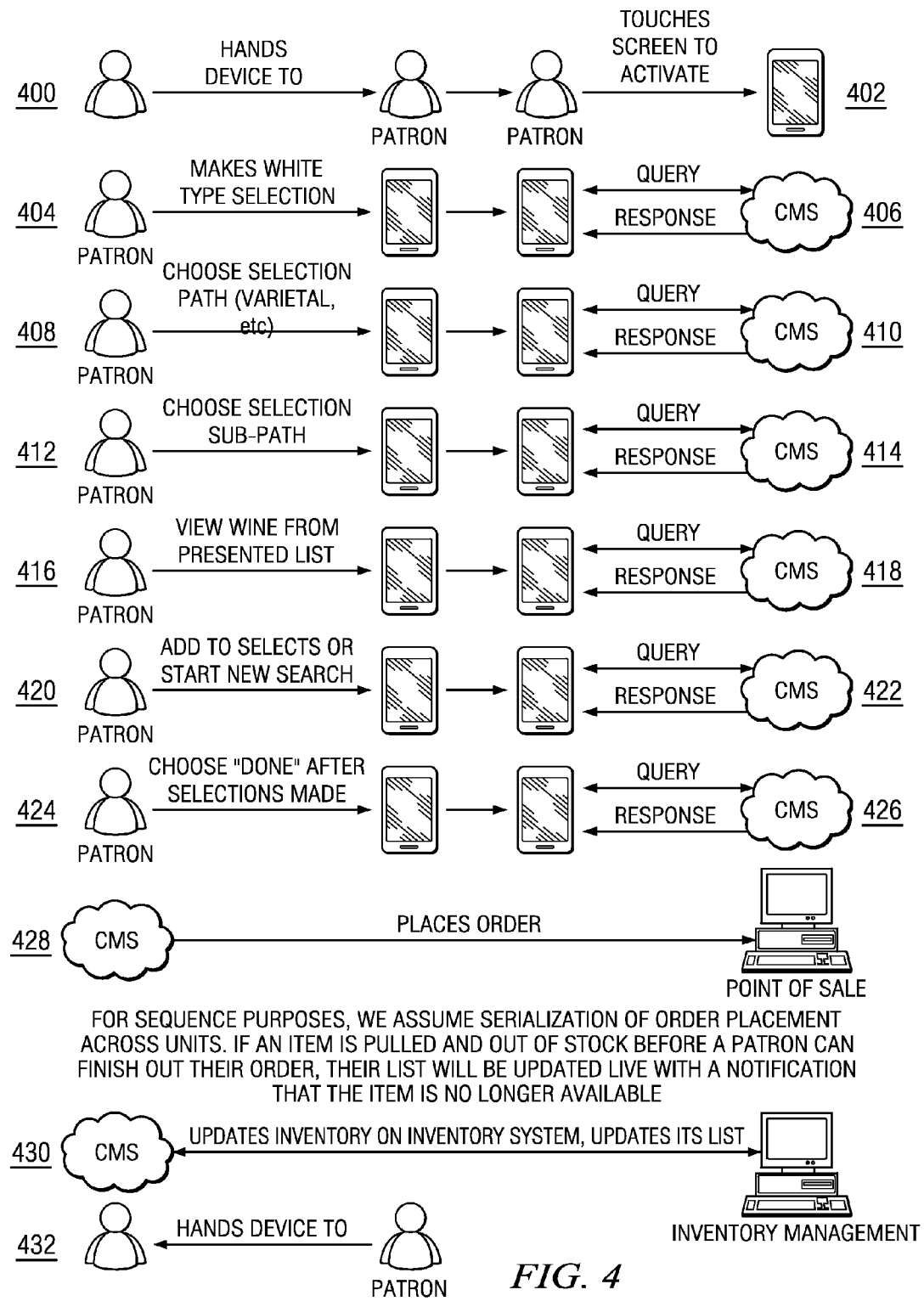
FIG. 4 is a diagrammatic representation of a second selection process as described herein.

FIG. 4 is a diagrammatic representation of a method of selecting and ordering a wine as described herein. Steps 400 through 426 of FIG. 4 are identical to or essentially the same as steps 300 through 326 of FIG. 3. In the embodiment illustrated in FIG. 4, after the patron has completed his or her selections and selected the "done" or "order complete" option at step 424, content management system 104 transmits the patron's selections to a point of sale device at step 428. This feature eliminates the need for the sommelier or waiter to physically enter the patron's order using a point of sale device. At step 430, content management system 104 updates the database of available wine inventory. Content management system 104 may also interface with inventory control system 126 (FIG. 1) to update the restaurant's inventory. In one embodiment, the inventory database maintained by content management system 104 and/or by the restaurant 102 is updated serially and continuously such that, if a wine becomes unavailable before a patron completes his or her order, the patron may be notified that a selected wine is no longer available. At step 432, the patron returns the patron display device 120 to the sommelier or waiter.

Figure 5A:
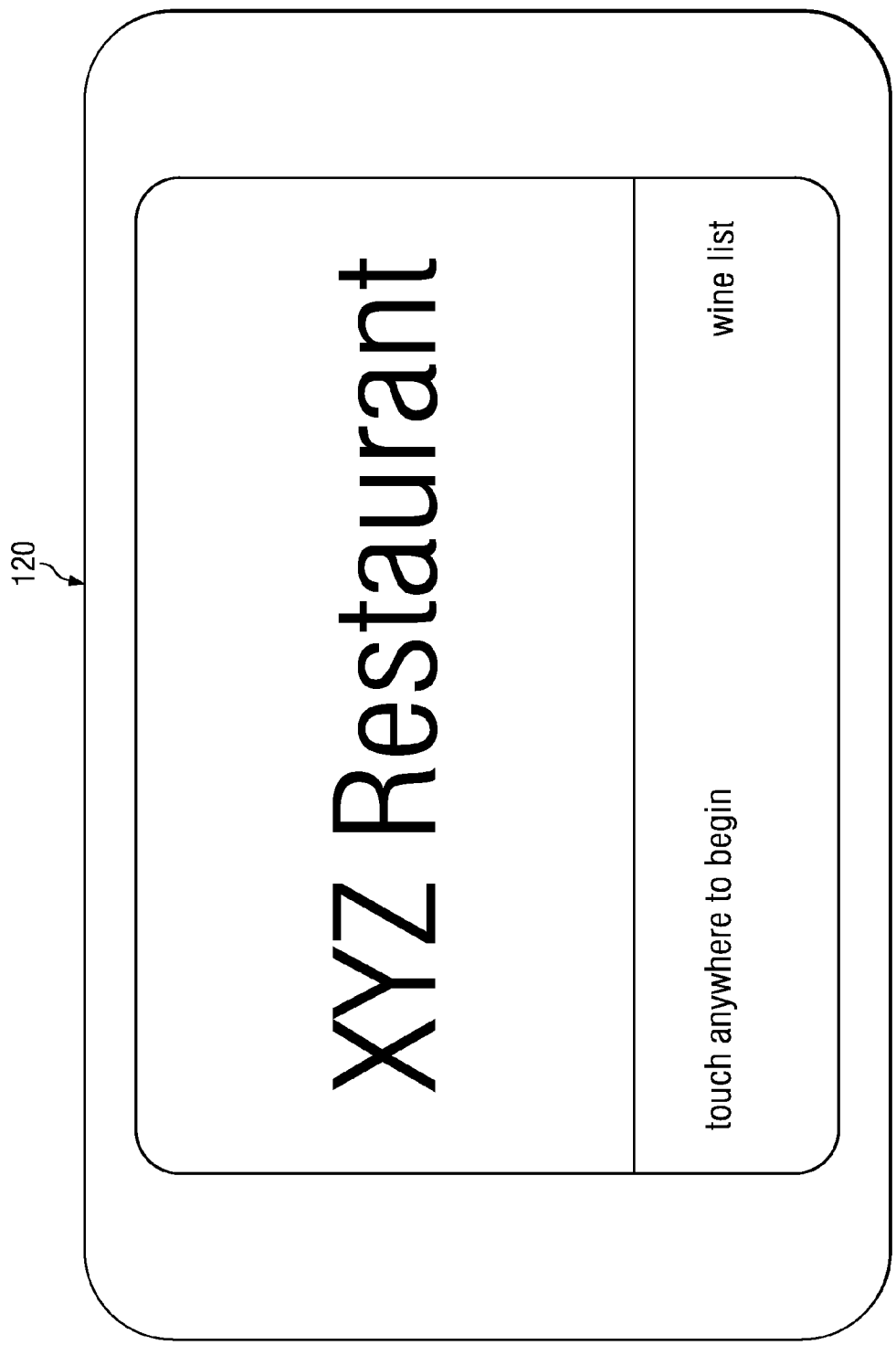
Figure 5B:
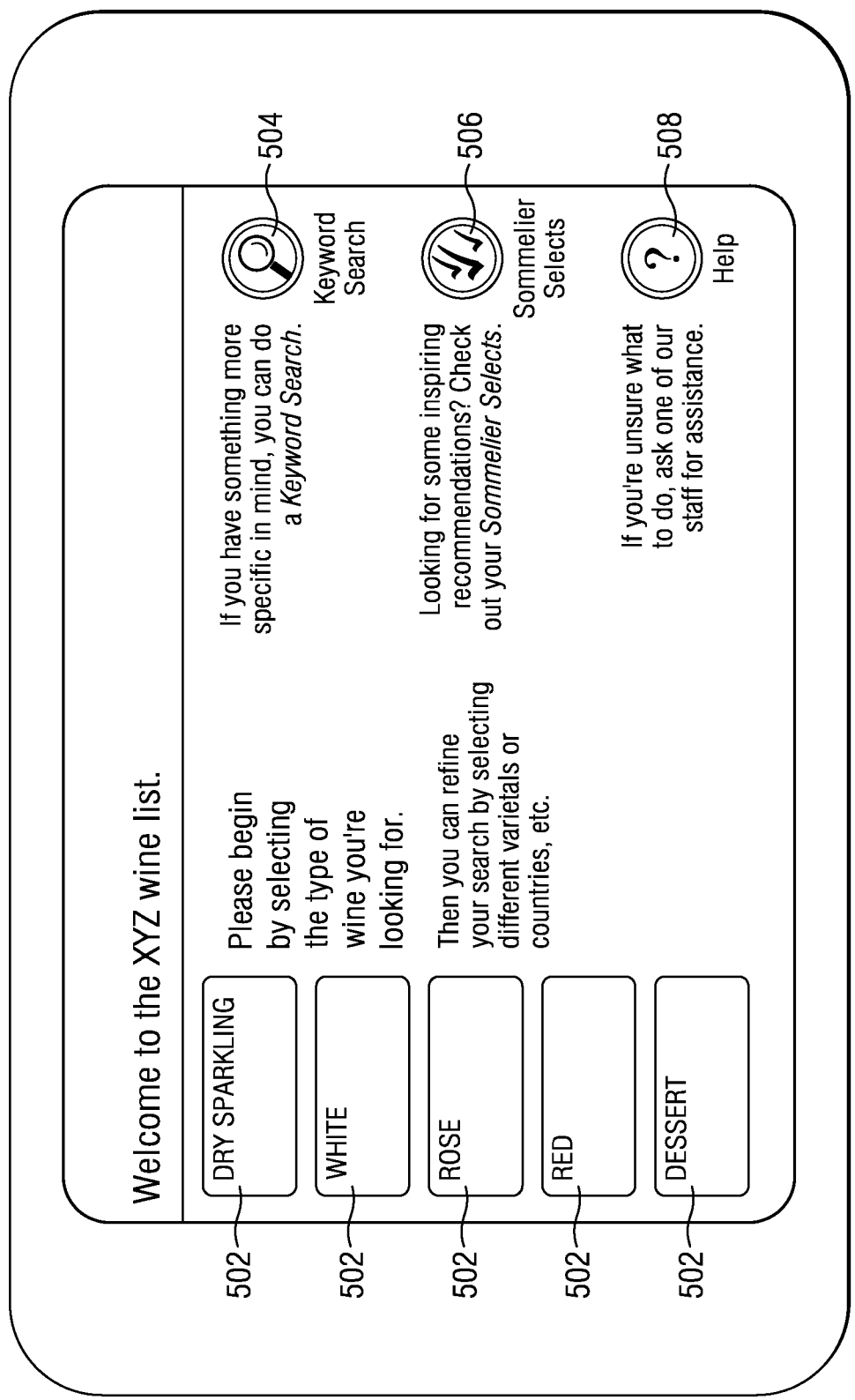

FIGS. 5A through 5J are a series of screens that may be displayed on patron display device 120 (FIG. 1) to aid a patron in making wine selections. FIG. 5A is an initial screen that prompts the patron to begin the process by touching screen 128 of patron display device 120. After the patron initiates the selection process by touching screen 128, a screen such as shown in FIG. 5B may be displayed. The screen of FIG. 5B prompts the patron to select a type of wine using buttons 502. The patron is also given the option of performing a keyword search by means of button 504, viewing wine recommendations using button 506 or summoning a staff member for assistance with button 508.

Figure 5C:
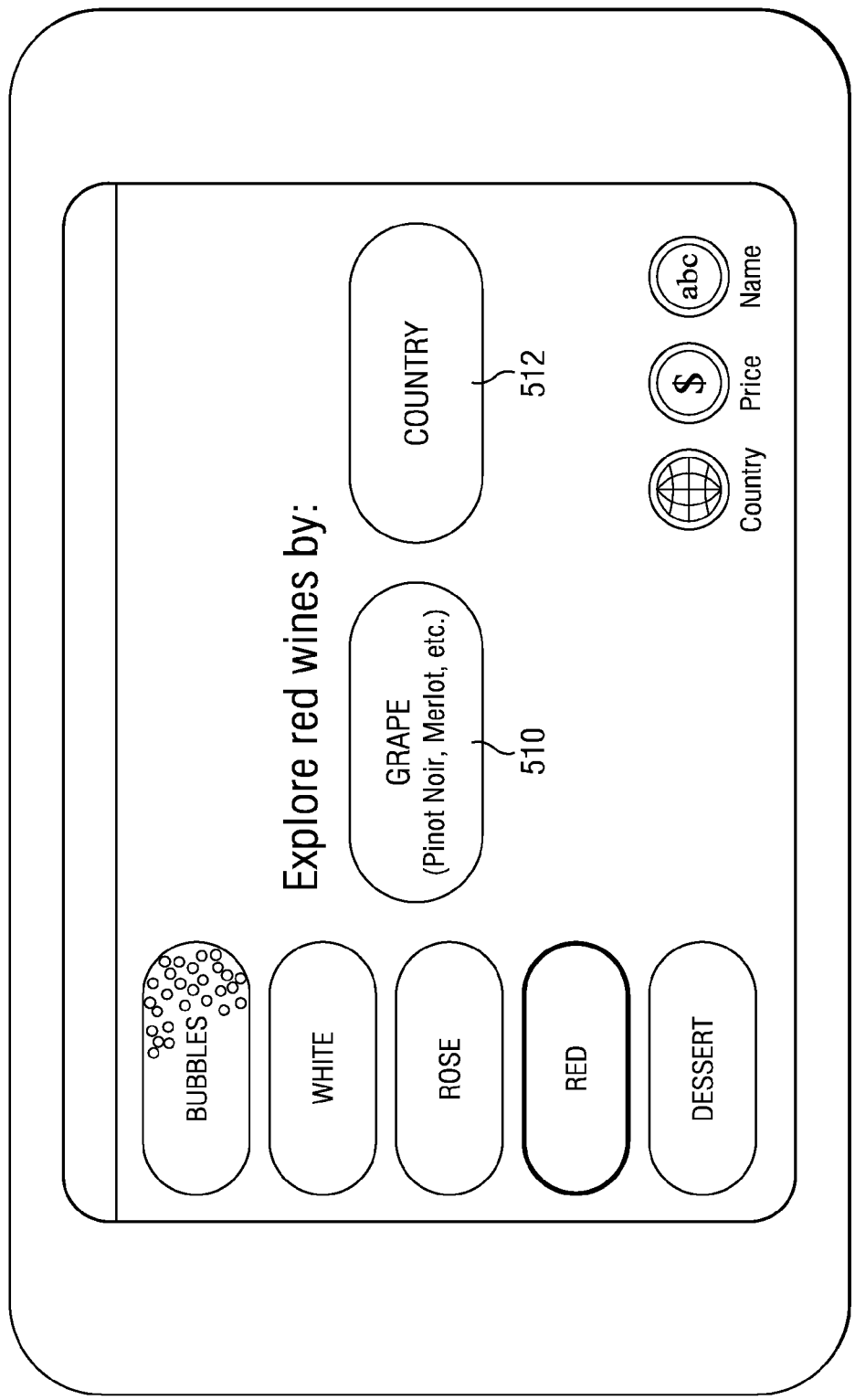
Figure 5D:
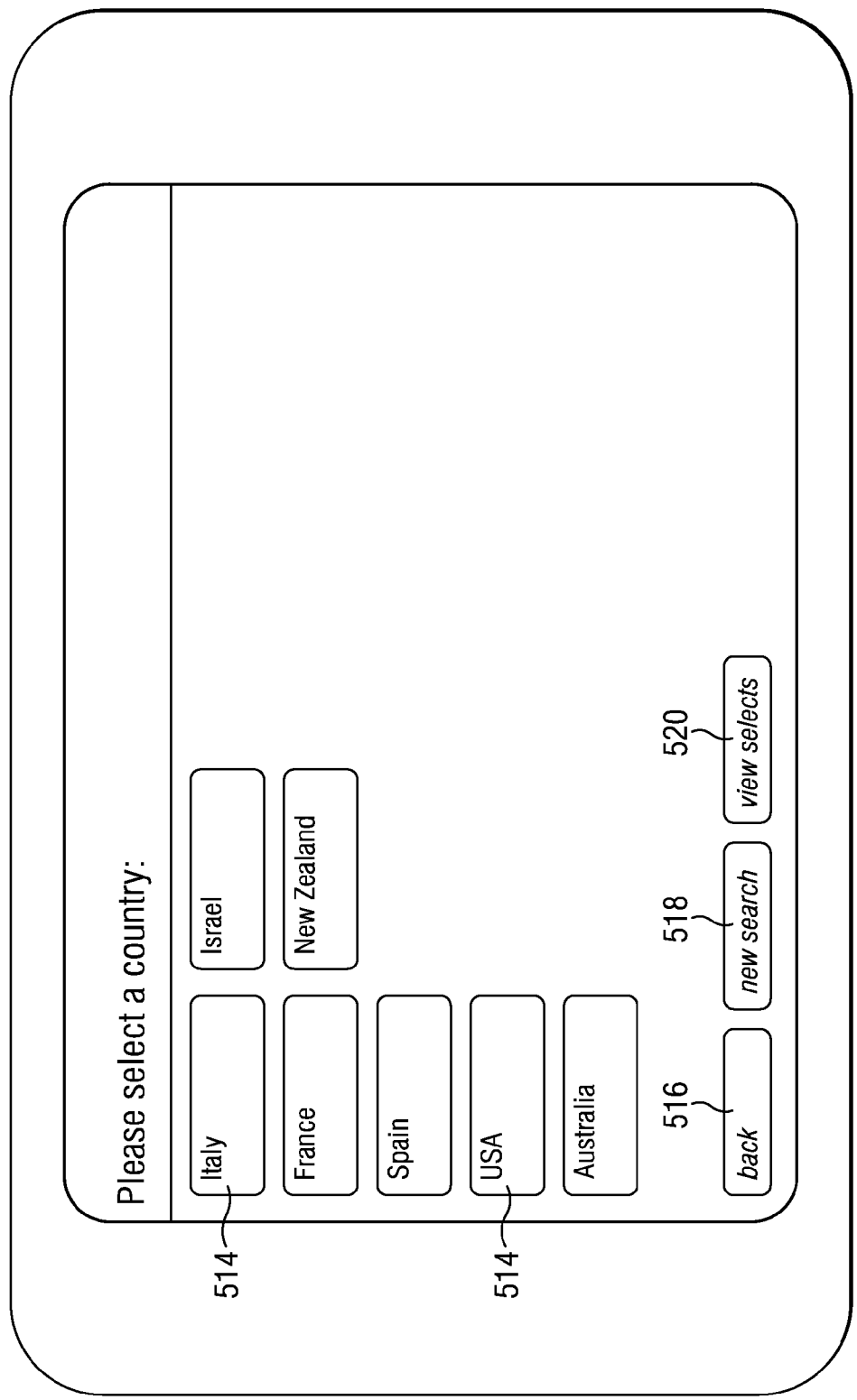

Assuming the patron has selected a red wine, a screen such as illustrated in FIG. 5C may be displayed. The screen of FIG. 5C enables the patron to continue to narrow his or her search by grape (variety), button 510 or by country, button 512. Assuming that the patron elects to narrow his or her search by country, a screen such as shown in FIG. 5D may be presented. As illustrated, the screen of FIG. 5D enables the patron to select different countries of origin using buttons 514 to continue his or her search. The screen of FIG. 5D also includes a "back" button 516 that enables the patron to move backwards in the search process. The patron may also initiate a new search with button 518 and view previously selected wines using button 520. If the patron, for example, selected Italy using screen 5D, or she may be presented with a screen as illustrated in FIG. 5E.

Figure 5F:
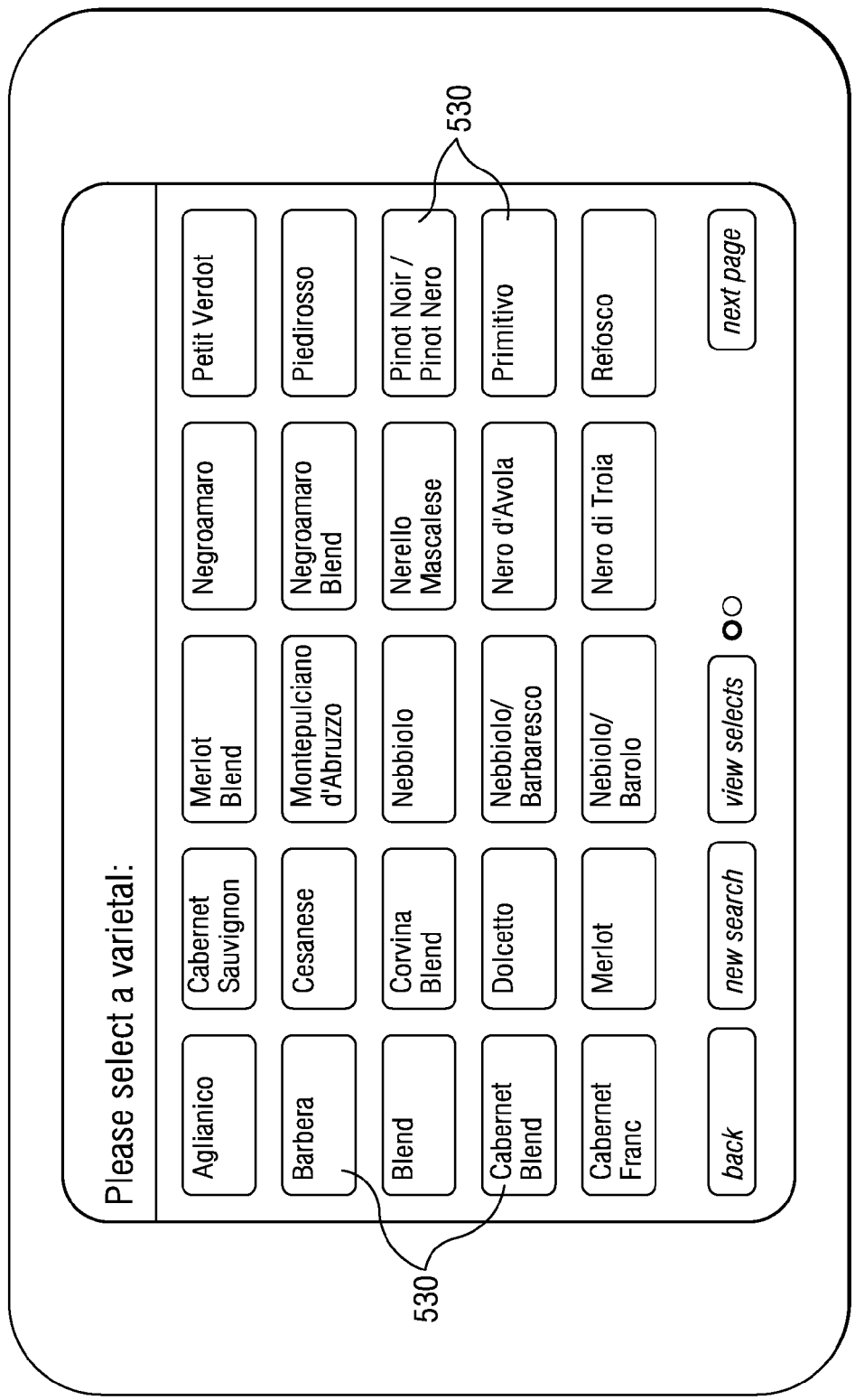

The screen of FIG. 5E enables the patron to view available Italian red wines. The screen of FIG. 5E further enables the patron to sort the available wines by name with button 522, by price with button 524 or by vintage with button 526. A "next page" button 528 enables the patron to scroll to the next page or the next display in the selection process. Referring again to FIG. 5C, if the patron had chosen to select a wine based on variety using the "grape" button 510, a screen such as shown in FIG. 5F may be displayed to the patron. As illustrated, the screen of FIG. 5F includes a number of buttons 530 each identifying a different wine variety thereby enabling the patron to narrow his or her search to a specific grape. If, for example, the patron selected Refosco from the screen of FIG. 5F, he or she may be presented with a screen similar to that illustrated in FIG. 5G which describes the Refosco variety of grape. If the patron elects to select a Refosco variety, he or she may be presented with a screen as illustrated in FIG. 5H. The screen of FIG. 5H illustrates the label of a bottle of Refosco type wine available. The screen of FIG. 5H also includes an "add to selects" button 532 which the patron may use to add the particular wine to his list of selections.

Figure 5I:
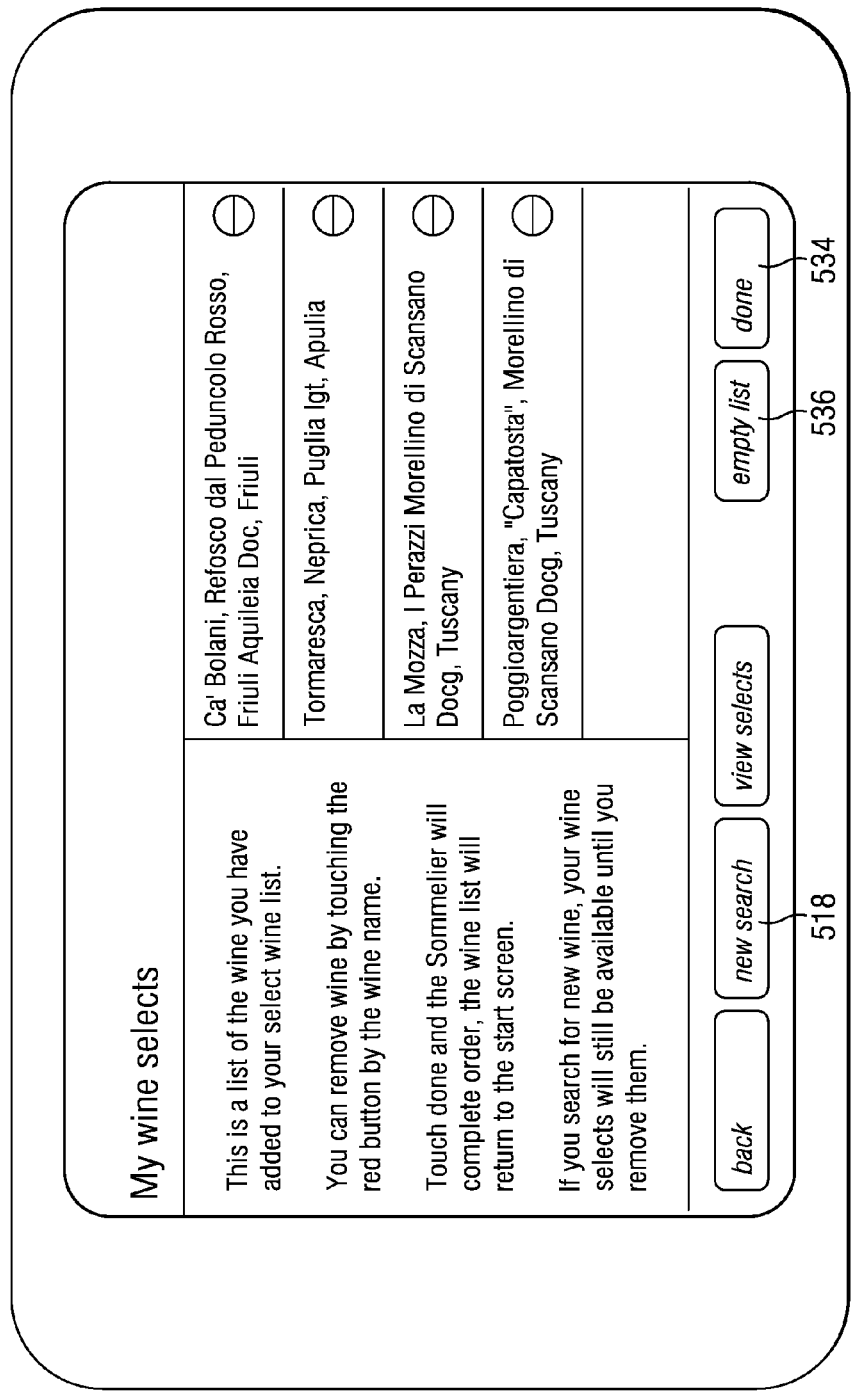
Figure 5J:
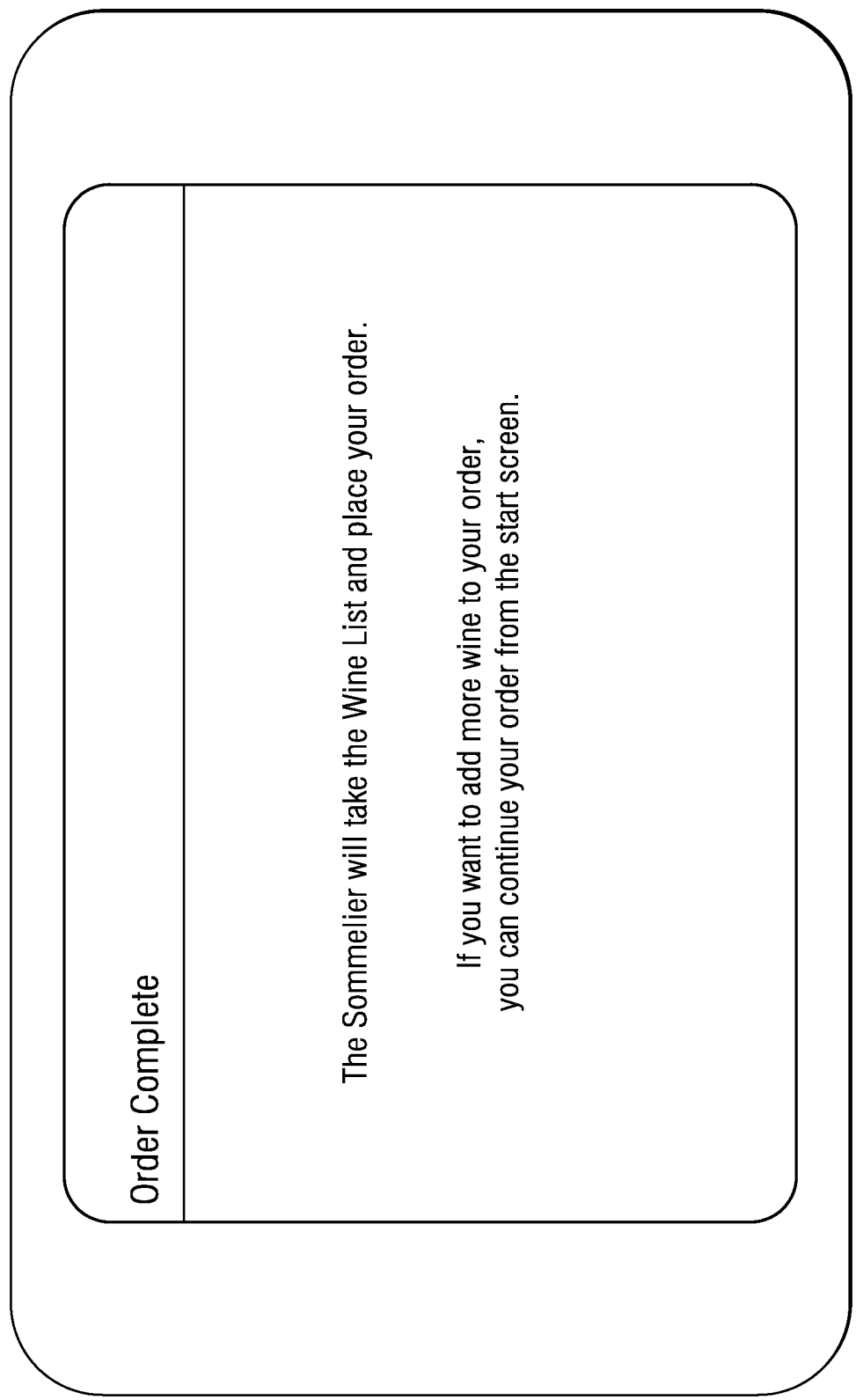

Referring now to FIG. 5I, as a patron continues the selection process, he or she may view a list of wines that he or she has selected. The patron may also be given the option of emptying the selection list using button 536 and/or initiating a new search using button 518. The display of FIG. 5I also includes a "done" button 534 that the patron may use to conclude the selection process. Assuming that the patron elects to conclude the search and selection process using button 534, the patron may be presented with a screen as shown in FIG. 5J. The screen of FIG. 5J directs the patron to return patron display device 120 to the sommelier who will place the patron's wine order.

Figure 6:
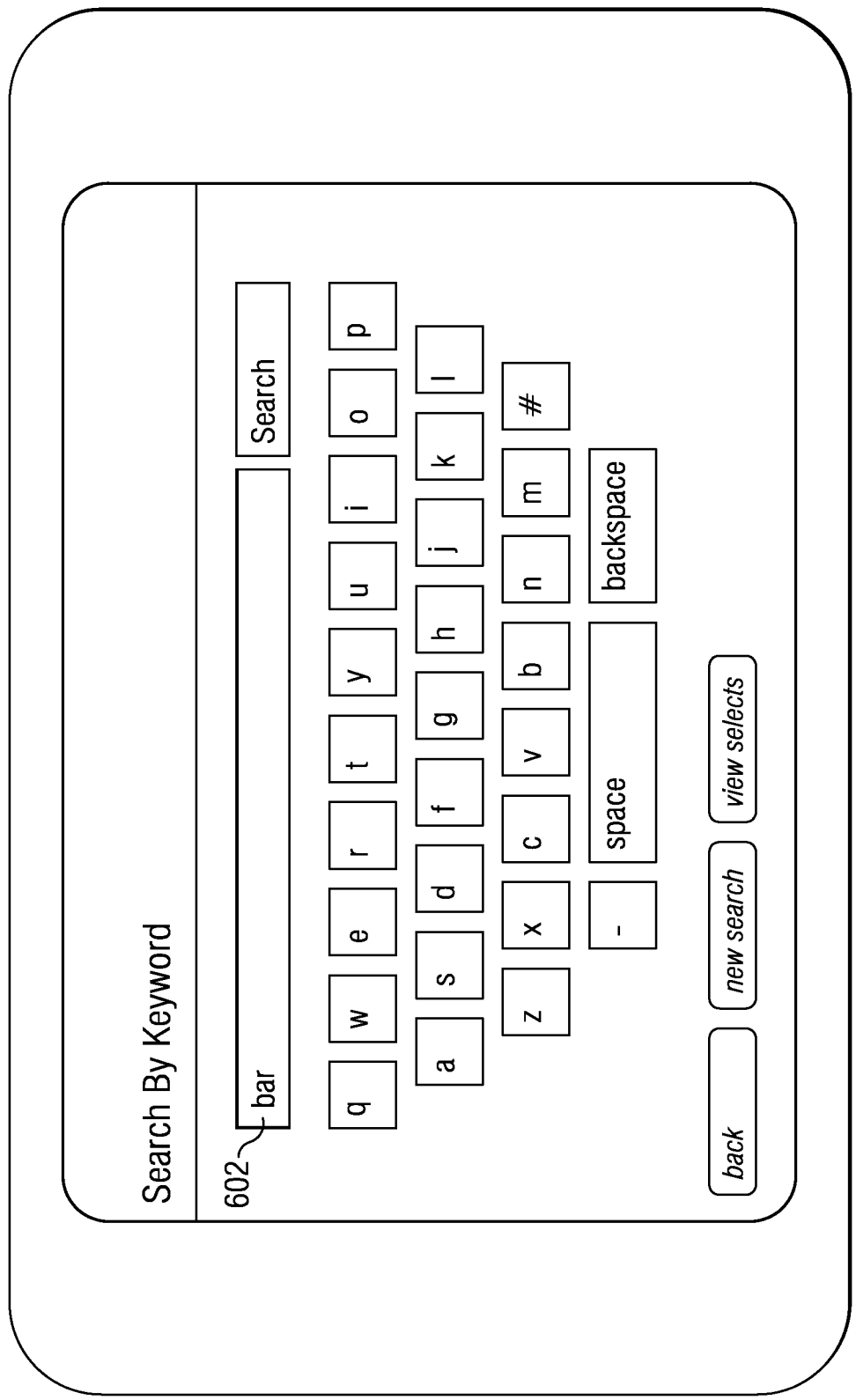
FIGS. 6 and 7 are additional screens that may be displayed on a patron display and selection device to aid a patron in drink selections.
Figure 7:
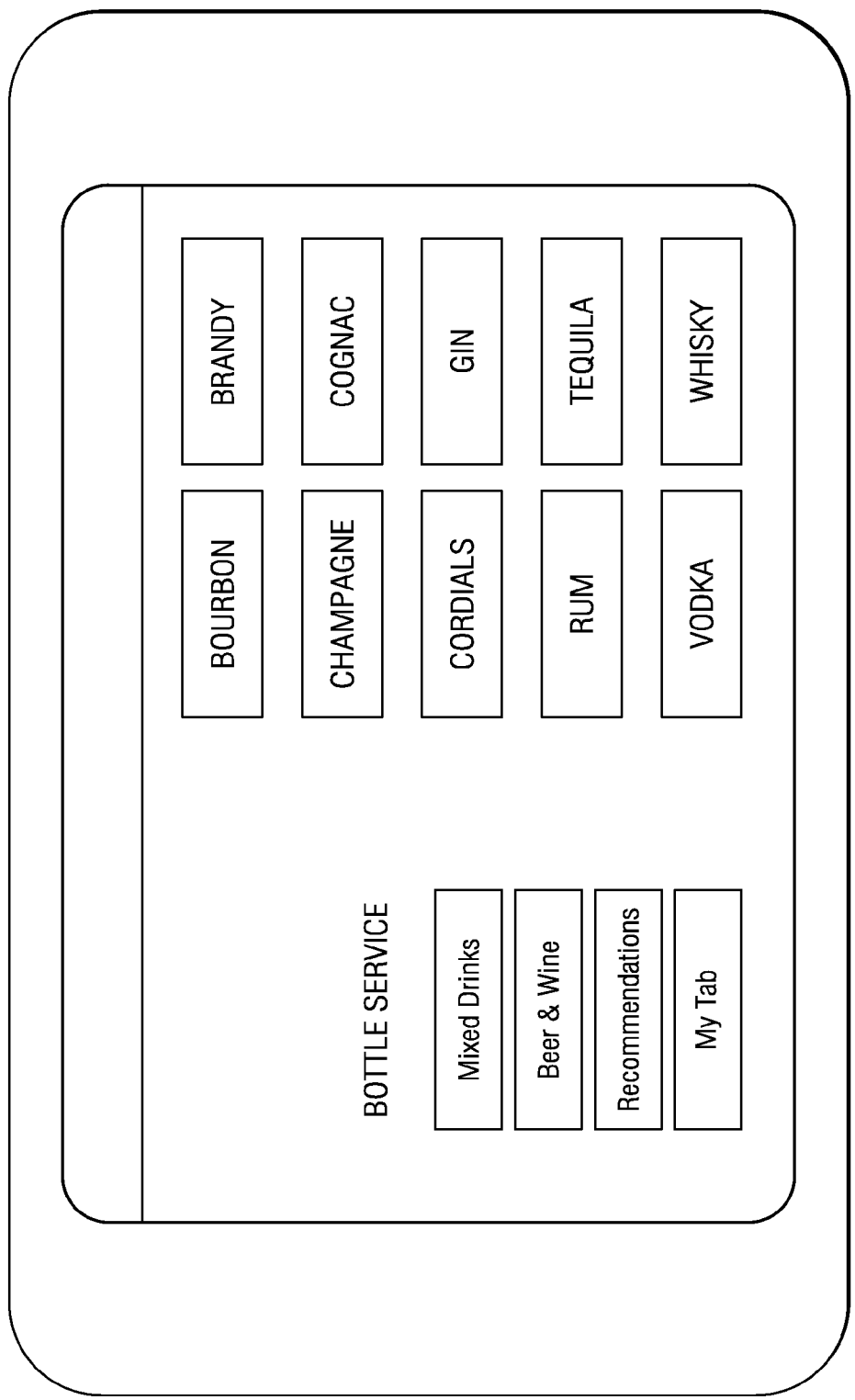

Referring now to FIG. 6, in some embodiments the patron may be given the option of searching by keyword. For example, if the patron entered the word "bar" into the display of FIG. 6, the patron may be presented with a screen such as shown in FIG. 7 giving the patron the option of selecting a bar drink. In this manner, system 100 of FIG. 1 may provide the patron with the option of ordering not only wines but also bar drinks and potentially other items.

Referring still to FIG. 6, in some variations, system 100 may be implemented to include features such as suggestive searching. In these embodiments, system 100 may include an algorithm and/or database that identifies common misspellings of various terms and suggests alternate possibilities. For example, if a patron searching for Italian inadvertently entered "Itaaly" rather than "Italy" in search box 602 of FIG. 6, the patron may be presented with a prompt, for example "Did you mean Italy?" The patron may then correct his or her selection, if necessary. A word completion feature may also be included. Thus, when the patron begins to enter a term in search box 602, he or she may be presented with a list of possible terms corresponding to the letters and or numbers that he or she has entered. The suggestive searching feature and word completion features may be implemented with preprogrammed instructions and/or databases resident on content management system 104 (FIG. 1). Alternatively, the suggestive searching function and/or word completion functions may be implemented with preprogrammed instructions and/or databases resident on patron display device 120.

In other embodiments, system 100 may utilize tag type searching wherein words, terms or phrases are used to "tag" records in a database such as illustrated in FIG. 1B. For example, a wine may use a visual logo of a pink elephant on the bottle label, even though the name of the wine, producer or appellation may not use the term "pink elephant" or have any other association with a pink elephant. However, the record for the wine in the database may have associated tags "pink," "elephant" or "pink elephant" in the record for the wine. Thus, a patron who remembers only that the label for a desired wine includes a representation of a pink elephant may enter "pink," "elephant" or "pink elephant" and locate any corresponding wine selections tagged with "pink," "elephant" or "pink elephant."

Figure 8:
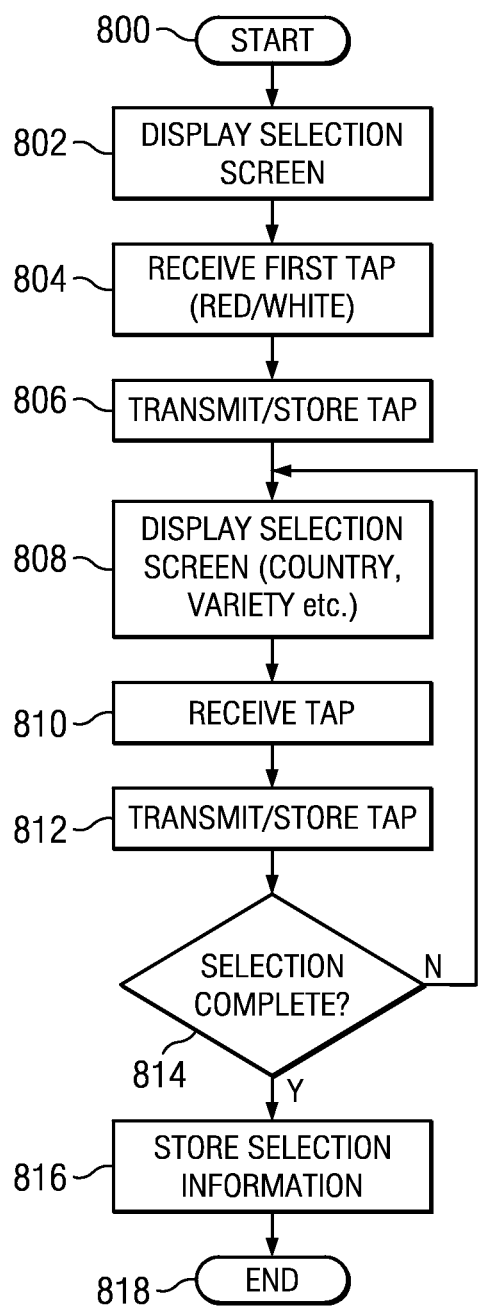
FIG. 8 is a flowchart illustrating a process for receiving and collecting information relating to wine selections by patrons according the system and method disclosed herein.

FIG. 8 is a flowchart illustrating a process for receiving and collecting information relating to wine selections by patrons. It will be understood that the process of FIG. 8 may be conducted concurrently with, or as part of, the process described in connection with FIG. 2. The process begins at step 800 when the sommelier or waiter presents a patron with a patron display device 120 (FIG. 1) for use in making a wine or other drink selection. The patron activates the device, for example by touching display screen 128 of patron display device 120 and a selection screen such as illustrated in FIG. 5B is presented at step 802.

At step 804, a first "tap" or selection is received from the patron. In one embodiment the selection may be between a red wine or white wine. Referring to FIG. 5B, the patron makes the selection by "tapping" or pushing one of buttons 502 presented on the display. The tap or selection is transmitted to content management system 104 and stored in database 110 at step 806. Upon receipt of the tap, content management system may select a subsequent selection screen based on the first tap. For example, if the patron selected a red wine, content management system 104 may transmit a screen for display at step 808 prompting the patron to select a country of origin or specific variety (grape) of red wine.

At step 810, a second or subsequent tap is received from the patron, transmitted from patron display device 120 to content management system 104 and stored at step 812. At decision block 814, the patron may indicate that his or her selection is complete. If not, the process loops back to step 808 where a subsequent selection screen is displayed. If, at step 814, the patron indicates that he or she has completed his or her selection, any desired selection information, for example price, quantity, vintage etc. that has not been previously stored by content management system 104 may be stored in database 110 (FIG. 1) at step 816. The process ends with step 818 when the patron has completed the selection process.

Figure 9:
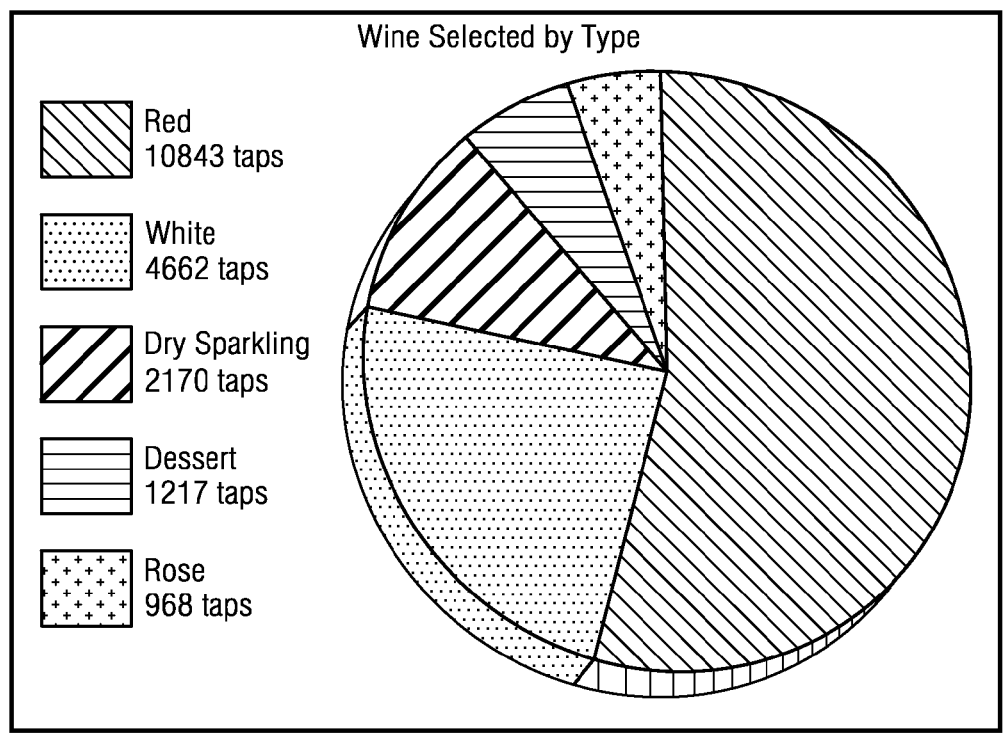
FIGS. 9-12 are graphical representations of data relating to wine selections that may be collected in one embodiment of the system and method described herein.
Figure 10:
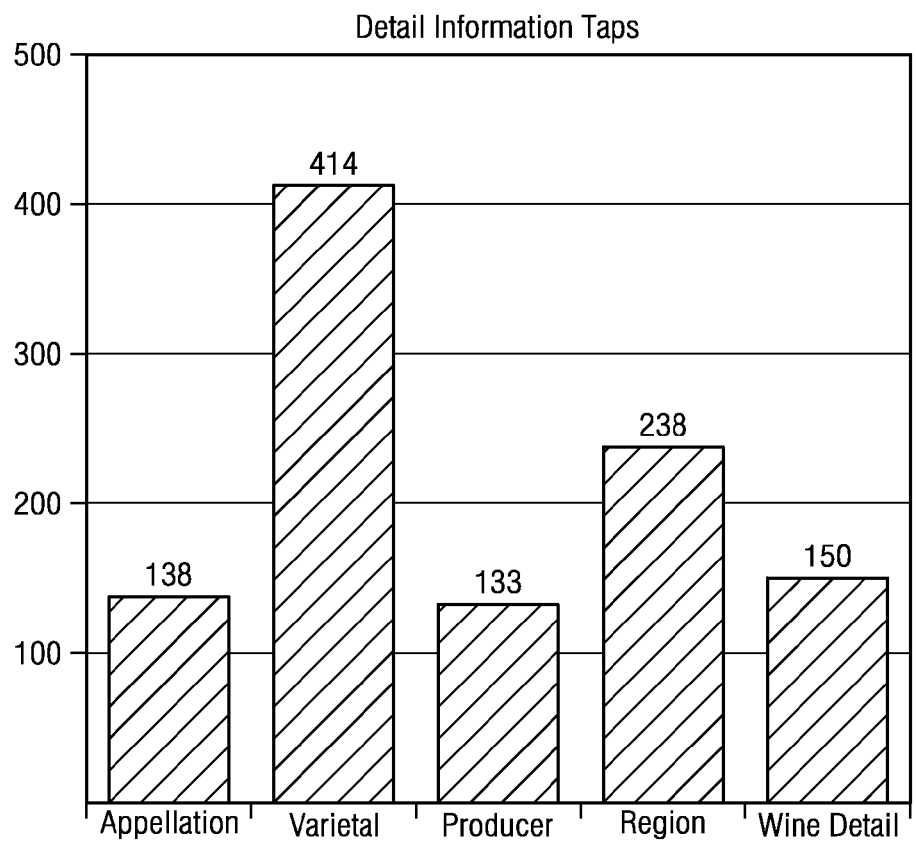
Figure 11:
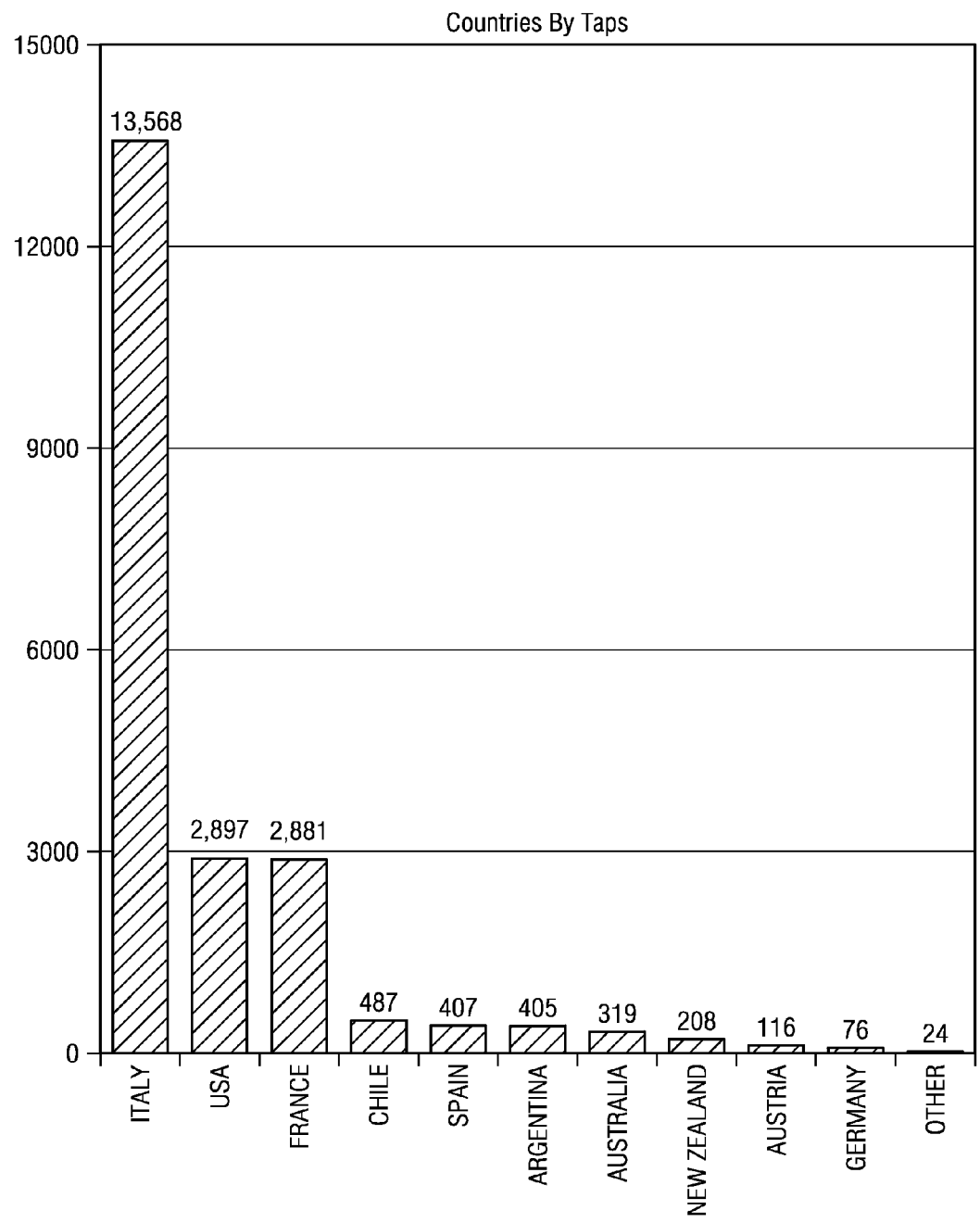

FIGS. 9-11 are graphical representations of the type of data that may be collected in connection with the wine selection process described herein. For example, FIG. 9 illustrates the number of "taps" or selections of red, white, dry sparkling, dessert and rose wines made by patrons during a predetermined time period. FIG. 10 illustrates the number of "taps" or selections by appellation, variety, producer, region and wine detail. It will be understood that patron selections or "taps" may be sorted in a variety of manners that do not necessarily correspond to the screens displayed on patron selection devices 120 or to the actual selections made by patrons. For example, a patron may select a particular wine based upon country and variety without specifying a specific producer; however, the collected information may enable content management system 104 to sort the selections by producer.

Figure 12:
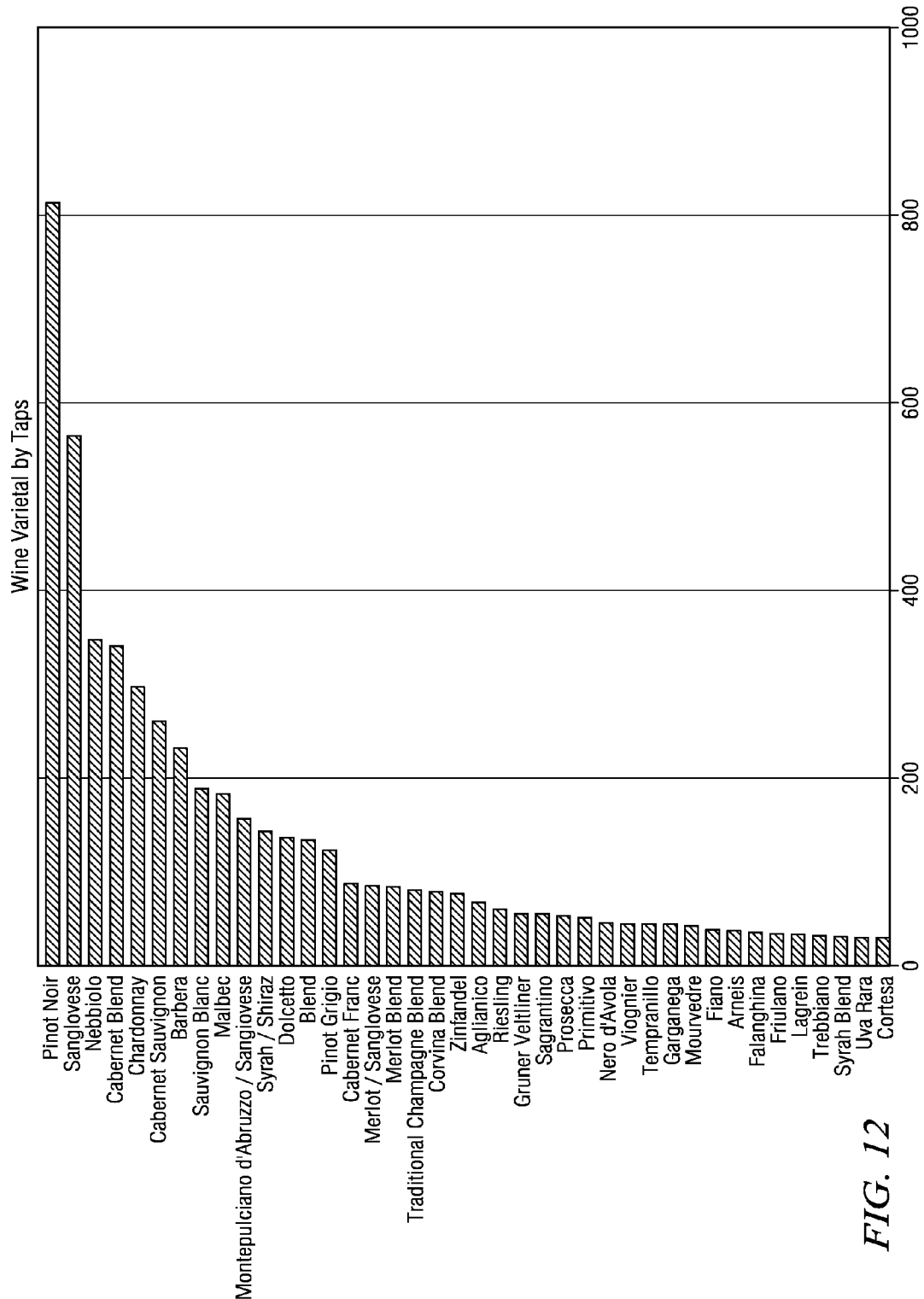

FIGS. 11 and 12 illustrate patron selections by country and variety. The collected information may be used to identify more and less popular wines, trends in patron selection, and seasonal trends. This information may, in turn, be used to adjust inventory levels, determine appropriate order quantities and identify the types of wine a particular restaurant should maintain in inventory. For example, if the demographics of the patrons of a particular restaurant are known, the collected information may be used to determine what wines a restaurant serving a similar demographic area should maintain in inventory. Similarly, the information may be correlated with the particular type of cuisine, e.g., French, German or Italian, served at a restaurant. In this manner, a restaurant proprietor may select appropriate types and appropriate inventory levels of wines offered at the restaurant.

Referring to FIGS. 13A-13D, system 100 (FIG. 1) may be utilized to present advertising or branding information to restaurant patrons via patron display devices 120. The advertising and branding information may be stored on one or more databases 110 (FIG. 1) and transmitted as a screen or part of a screen for display on a patron display device 120 at different times when the patron display device is in use by a restaurant patron. For example, a promotion for a product, event or business may be displayed for a brief period, for example several seconds, when patron display device 120 is activated or at various other times or stages during the wine selection process. In other variations, a "continue" or "next" button 1302 (FIG. 13A) may be presented as part of the display. In this case, the promotional material will be displayed until the patron presses the "continue" or "next" button.

Such promotional displays may be fixed, e.g., the same displays are presented to each patron at the same stage or stages during the selection process. In other embodiments, selected promotional screens may be linked to a particular selection parameter, for example by means of a relational database, and displayed in response to a patron's response to a particular wine selection or selection criteria. Multiple related or unrelated advertisements or similar promotions may be displayed on a single display screen.

Figure 13A:
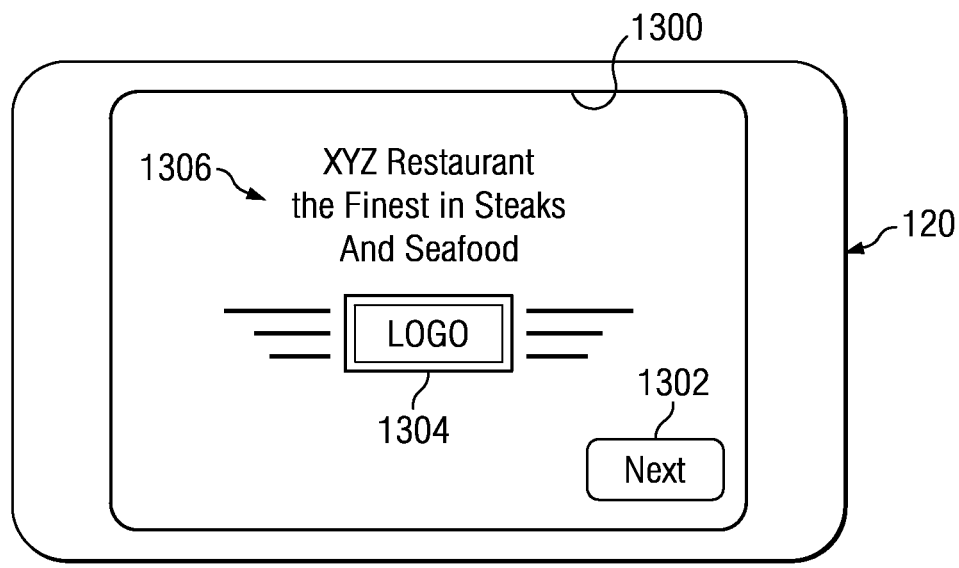
FIGS. 13A-13D are exemplary representations of display screens for branding and promotional purposes.
Figure 13B:
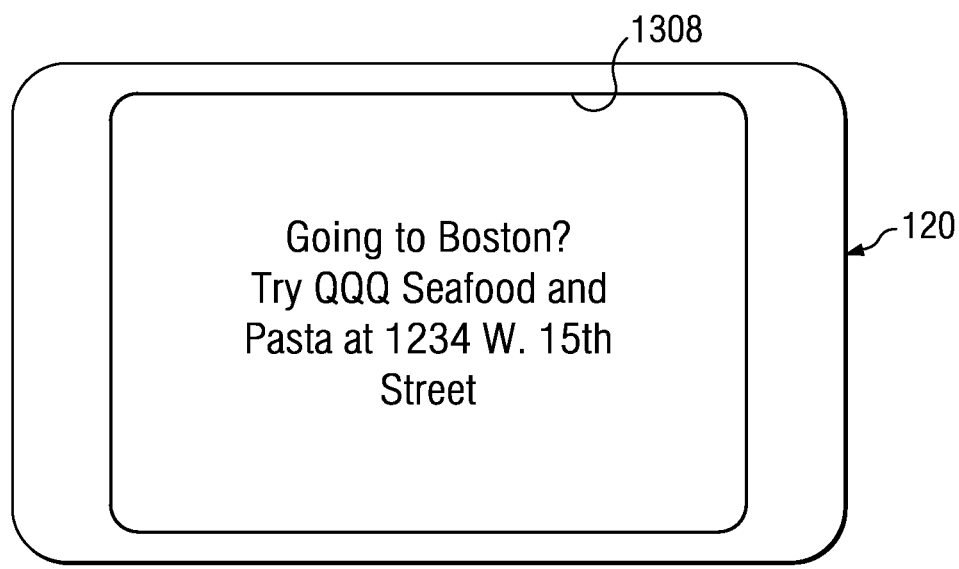

A variety of different screens may be used for branding and promotion of different goods and services. FIG. 13A is a representative branding screen for a restaurant where system 100 (FIG. 1) is implemented. The screen may include a logo, trade or service mark 1304 used by the restaurant and/or promotional text or similar materials 1306. An exemplary screen 1308 for a related or affiliated restaurant in the same or different city or location is illustrated in FIG. 13B.

Figure 13C:
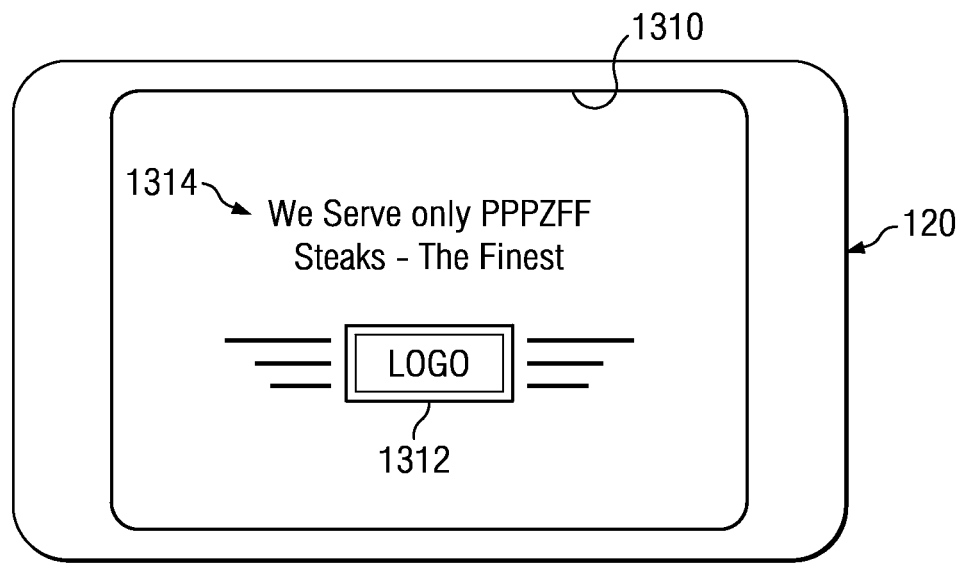
Figure 13D:
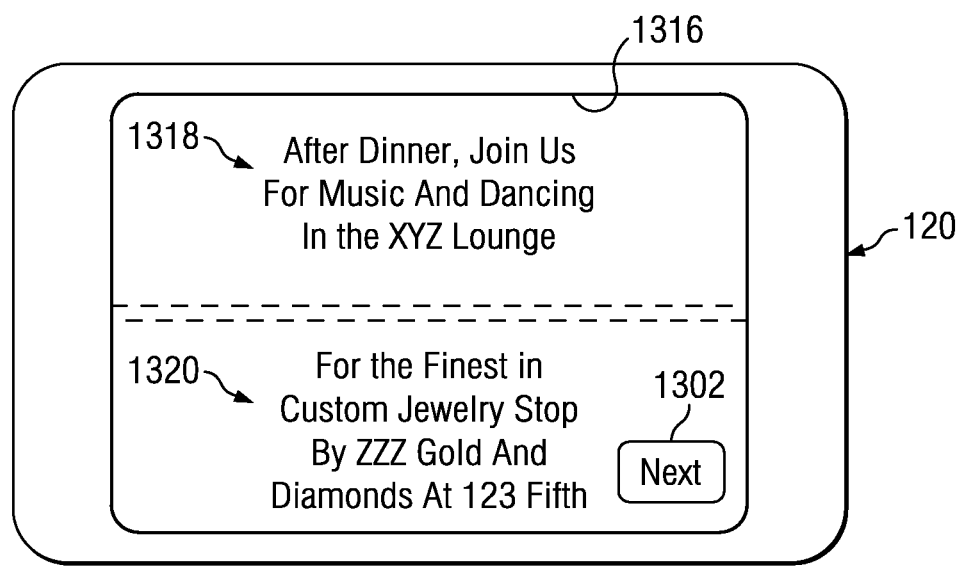

A display screen 1310 may be used to promote products served at a restaurant where system 100 is implemented as illustrated in FIG. 13C. A logo 1312 and/or promotional text 1314 promoting the particular product may be included in the display screen 1310. Multiple goods or services may be incorporated into a single display screen. For example, the exemplary screen 1316 of FIG. 13D includes promotional material 1318 for a lounge and additional promotional material 1320 for a jewelry store.

Figure 14:
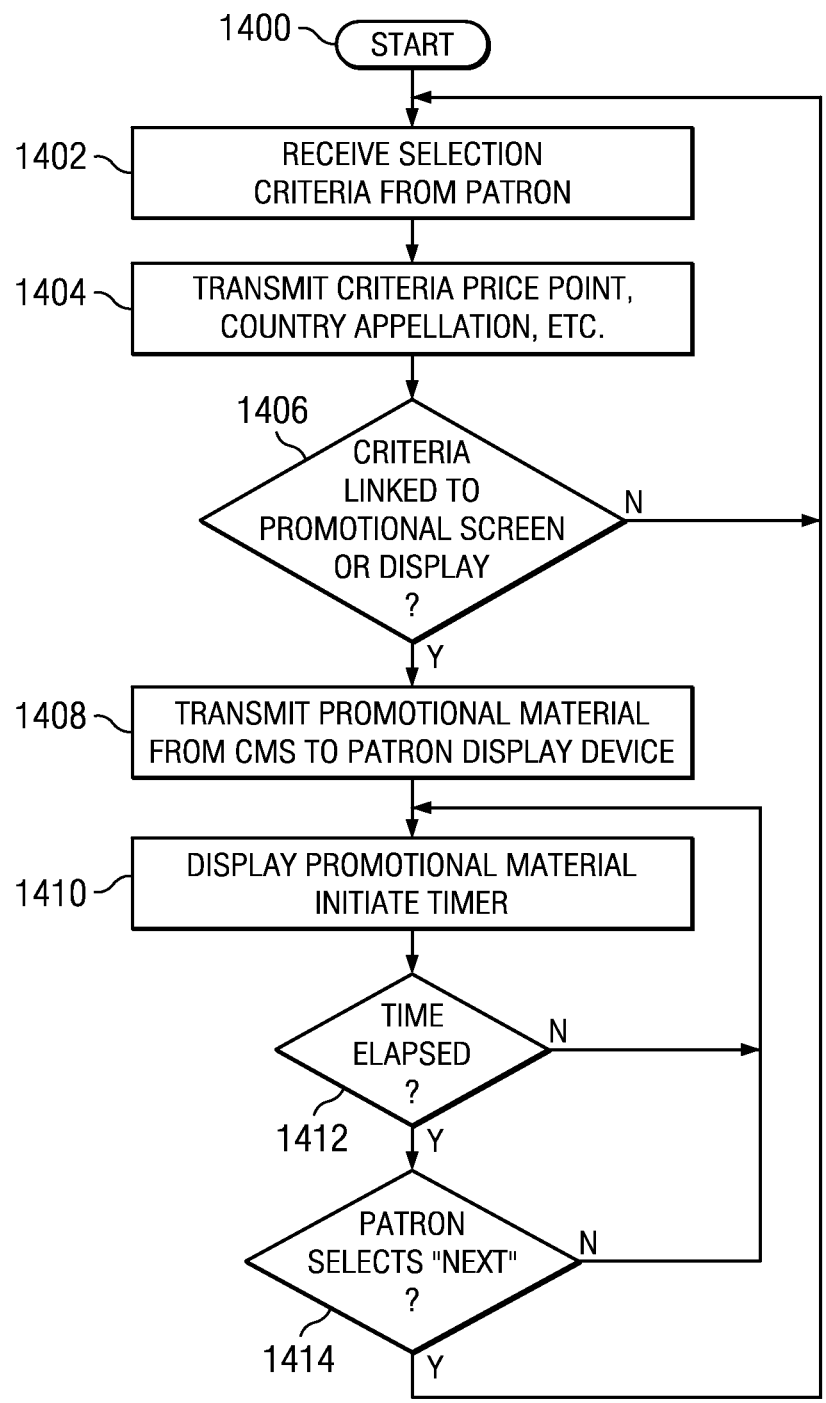
FIG. 14 is a flowchart of a method utilizing a system as described herein for display of promotional materials.

FIG. 14 is a flowchart of a method wherein different display screens for different products and services may be selected for display to different patrons based on selection criteria identified by the patron during the wine selection process or associated with a particular selection or criteria. The method begins at step 1400 where a patron display device 120 is activated. At step 1402, a selection parameter is received from the patron using patron display device 120. The linked selection criteria may, for example, be a country of origin, a price point or price range corresponding to a selection or other parameter such as, but not limited to, those illustrated in FIG. 1B. The selection criteria is from patron display device 120 to content management system 104 at step 1404 and compared to a list of linked criteria or parameters at decision block 1406. If the parameter, for example, price point or country of origin, is not linked to the promotion screen or display, the process loops back to step 1404 and the wine selection process continues.

If the selection criteria or parameter is linked to a specific display of promotional material, the display screen is transmitted from content management system 104 to patron display device 120 at step 1408 and displayed to the patron at step 1410. In one embodiment, a timer may be initiated at step 1410 to limit the amount of time the display is presented to the patron. In other embodiments, the display may include a "next" button such as button 1302 of FIG. 13A. If the timer elapses at decision block 1412, or if the patron presses the "next" button at step 1414, the process loops back to step 1402 and the method is repeated until the selection process is completed.

Figure 15:
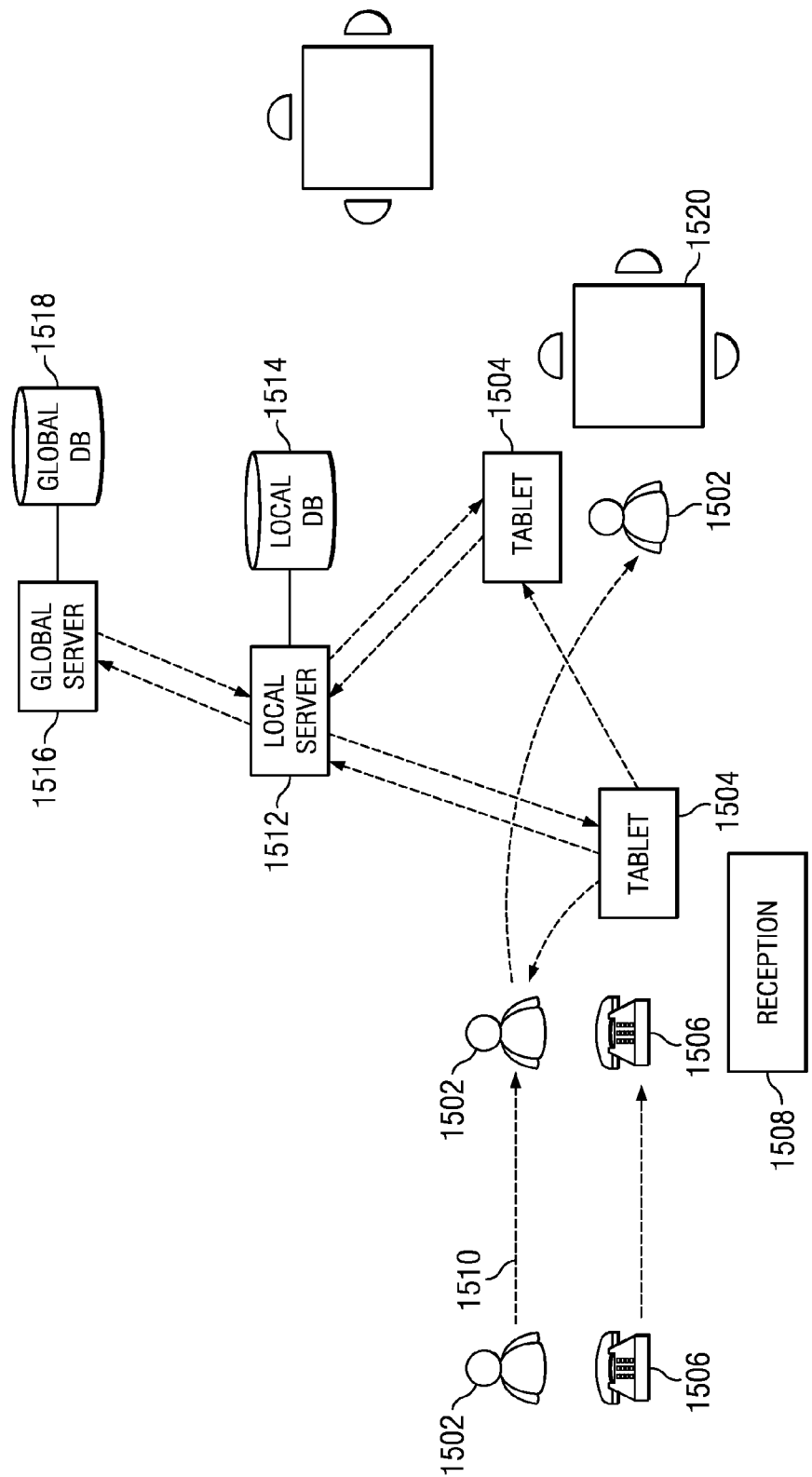
FIG. 15 illustrates a diagrammatic view of a restaurant infrastructure for providing the personal experience.

Referring now to FIG. 15, there is illustrated a diagrammatic view of the overall infrastructure for providing to a patron or guest 1502 a patron display device or tablet 1504 in a restaurant setting. The patron 1502 can make a telephone connection through a patron telephone device 1504 to a facility telephone device 1506 to make a reservation. A receptionist at a reception site 1508 can take the call and make the reservation and, at that point in time, identify the patron. By identifying the patron, it is possible that a tablet 1504 can be associated with that patron upon the patron arriving at the restaurant. This is illustrated with the dotted line 1510 wherein the patron 1502 arrives at the restaurant or establishment. If a reservation had not been entered into the reservation book prior to the patron arriving, the receptionist upon arrival can determine the identity of the patron at that time, as will be described hereinbelow.

Once the patron arrives and, if there is a reservation, at that time the receptionist may enter the patron's identity into the tablet 1504. Of course, the information could have been entered prior to the patron arriving such that tablet 1504 is personalized prior to the patron 1502 arriving and then giving the tablet 1504 to the patron 1502. This identification procedure will access a local server 1512 at the establishment which then can access local database 1514. The local database 1514 may contain updated information regarding the patron 1502. If not, the local server 1512 can then interface with a global server 1516 to determine if information regarding this particular patron 1502 exists in a global database 1518. If information regarding the patron 1502 is found in the global database 1514, that information will then be downloaded to the tablet 1504. As stated hereinabove, tablet 1504 will interface with the local server via a wireless connection or some other type of connection.

Once the patron 1502 receives tablet 1504 upon entering the restaurant or establishment, the patron is then shown their table 1520 and the tablet 1504 accompanies that patron 1502. As described hereinabove, the tablet 1504 allows the patron 1502 to interface with not only various menu items, but also with the wine list. Also as noted hereinabove, tablet 1504 is constantly in communication with the local server 15012 and the local database 1514.

Figure 16:
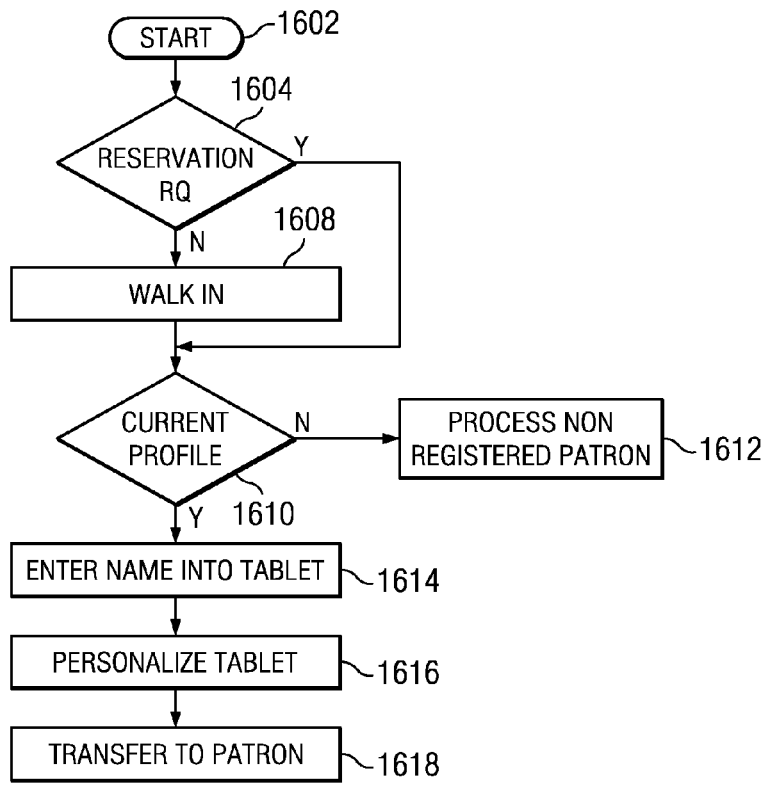
FIG. 16 illustrates a flow chart depicting the process of receiving a tablet upon entering the restaurant.

Referring now to FIG. 16, there is illustrated a flow chart depicting the operation of personalizing or identifying a particular patron 1502 for a given tablet 1504. This is indicated at a start block 1602 and then proceeds to a decision block 1604 to determine if a reservation request has been received. If so, the program flows along a "Y" path and if not the program flows along a "N" path. Along the "N" path, the program flows to a function block 1608 which defines the patron as a walk-in patron. When either the patron initiates the contact via a reservation or via just a walk-in, the program flows to a decision block 1610 to determine if there is a current profile for that patron or guest. If the current profile is not in the database, the program flows along an "N" path to a function block 1612 in order to process the patron who does not have a current profile registered in the database. This will be described hereinbelow. If, however, the patron does have a current profile on file at either the local database 1514 or the global database 1518, the program flows along a "Y" path to a function block 1614 in order to enter that information into a tablet, i.e., the tablet will be personalized as indicated by function block 1616. Once the tablet is personalized, the program flows to a function block 1618.

Figure 17:
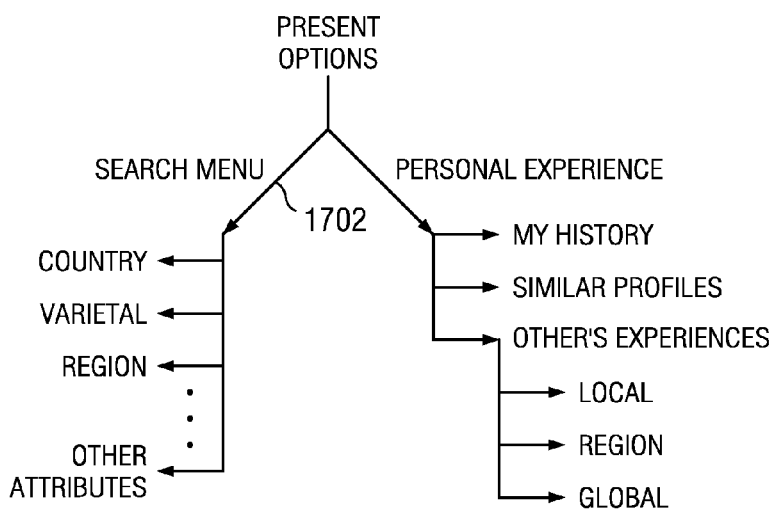
FIG. 17 illustrates the general operation of providing choices on the menu to a patron.

Referring now to FIG. 17, there is illustrated a basic decision tree for interfacing with the tablet after personalization thereof. A particular patron, once presented with the personalized tablet 1504, will be presented with multiple selections. The patron can select the normal process as set forth hereinabove and merely search the wine menu and follow a path 1702. This allows the user to peruse the menu and sort wines by country, varietal, region or any other attribute associated with wines that are in inventory. This searching, as described hereinabove, allows the patron access to information regarding any particular wine that is listed on the menu, including information regarding the number of bottles of wine in stock, ratings associated with a particular bottle of wine or vintage and any other attributes that are available. When the wine is entered into the database by the sommelier, there are many attributes that can be associated with a wine. These attributes will be such things as the vintage year, the type of grape, the vineyard, the region and the country in addition to a picture of the label and a "flavor profile." This flavor profile is a method used to describe the total character of a flavor as expressed in predetermined descriptors by a trained panel. In essence, the flavor profile describes the flavor in terms of number of the major components such as character notes for attributes, intensities of those attributes, the order of appearance of the attributes, aftertaste and amplitudes (a complex phenomenon defined as the overall impression of the blends of the analyzable and non-analyzable flavor components). When defining a flavor profile for a particular wine, there are many interdependent factors that must be considered with respect to wine flavor such as the varieties of grapes that are used, the location where the grapes are grown (appellation), the treatment of those vineyards along with the skills of the vintner and the techniques used by the wine maker, as well as his skills in applying them. However, the dominant factor affecting wine flavor is the grape variety. When considering a grape such as a Merlot grape, the typical smell and/or flavor descriptors are defined in terms of, for example, the varietal aroma/flavor such as fruity (currant, black cherry, plum), floral (violet, rose), spice (caramel, clove, bay leaf, green peppercorn) or herbal (bell pepper, green olive). Also, there will be provided processing bouquets/flavors such as oak (light), (vanilla), (coconut), (sweetwood), oak (heavy), oak (smoke, toast, tar) or bottle age (truffle, mushroom, earth, coffee, cedar, cigar box). Thus, the sommeliers has many flavor profile descriptors available for them in order to describe a particular wine. Typically, a given bottle of wine from any particular vintage will have a flavor profile associated therewith. This can be modified to various personal experiences of experienced tasters. This, of course, is up to the sommelier as to how a wine is entered into the database.

Referring further to FIG. 17, it can be seen that the patron has the ability to search through many different aspects of a particular wine, as described hereinabove. Further, even ratings of a particular wine, as defined by experienced tasters, can be viewed, if the patrons desire to go through that level of detail.

Alternatively, the patron can select a path 1704 that will be associated with their personal experience with a particular wine and, more specifically, to that restaurant. One path will be the history of that patron at a particular restaurant labeled "my history." This path will allow the patron to be presented with information regarding their personal experience at a particular restaurant at which they are dining or have dined in the past. This is important in that, even though the particular wine that they are viewing has common characteristics due to the fact that it has a common vintage and was bottled by a particular wine maker at a particular vineyard, the handling of the wine could be different. Each restaurant could be argued as having particular quality standards that may actually affect the wine quality. Thus, a patron buying a bottle of wine at one restaurant versus another restaurant may actually result in a different personal experience. This could even be as simple of the type of glass the wine is served in. Thus, what is important is that a patron be presented with information regarding their personal experience as to a particular wine that they have experienced at this particular restaurant (or some other restaurant) sometime in the past. As will be described hereinbelow, the patron is provided the opportunity to actually rate their experience with that particular wine—after having ordered such with their meal—and have it stored in the database in association with their profile.

In addition to viewing history of various wines that they have had at that particular restaurant, they can also view their history at higher levels, such as their history with other restaurants in a particular chain. They can also view their history on a global basis at restaurants participating in the global program with respect to the information in the global database 1518. Thus, a patron dining in London may be presented with a wine choice that is present in the wine cellar of that particular establishment and, even though the patron had not been to this restaurant before, they could view their history with respect to, for example, a restaurant in New York that they had previously dined in and had some experience with a particular varietal. In addition to the particular wine on the wine list being presented to the user as a wine that they may have had a history with, the tablet may display to the patron as to the availability of that wine in stock. If that wine is not in stock, the patron can be presented with information regarding similar flavor profiles. Another alternative is that, even though that particular restaurant may not have a particular wine for which a patron has had a previous experience, they can list that wine in the patron's history for viewing by the patron indicating that they do not have that wine in stock but the patron will be allowed to view similar wines with a similar flavor profile. By providing such, it is possible to present to a particular patron information regarding a varietal such as, for example, a cabernet sauvignon that they had previously had a very good experience with at some restaurant in either a particular chain or elsewhere and present to the user several similar flavor profiles. If the patron, for some reason, had a preference for full bodied red wines, it is possible to allow the patron access to wines with similar flavor profiles that are actually in stock within a particular restaurant in which they are dining The user can also expand the experience by viewing the experience of others that have actually dined at that particular restaurant or to restaurants in that chain. The reason for this is that a patron dining in London, for example, may wish to see what other patrons of that restaurant thought of the wines in that restaurant's particular cellar. By doing such, the choice of wine is parameterized by more relevant information regarding a particular wine cellar as opposed to just generic information spread over the industry in general.

Figure 18:
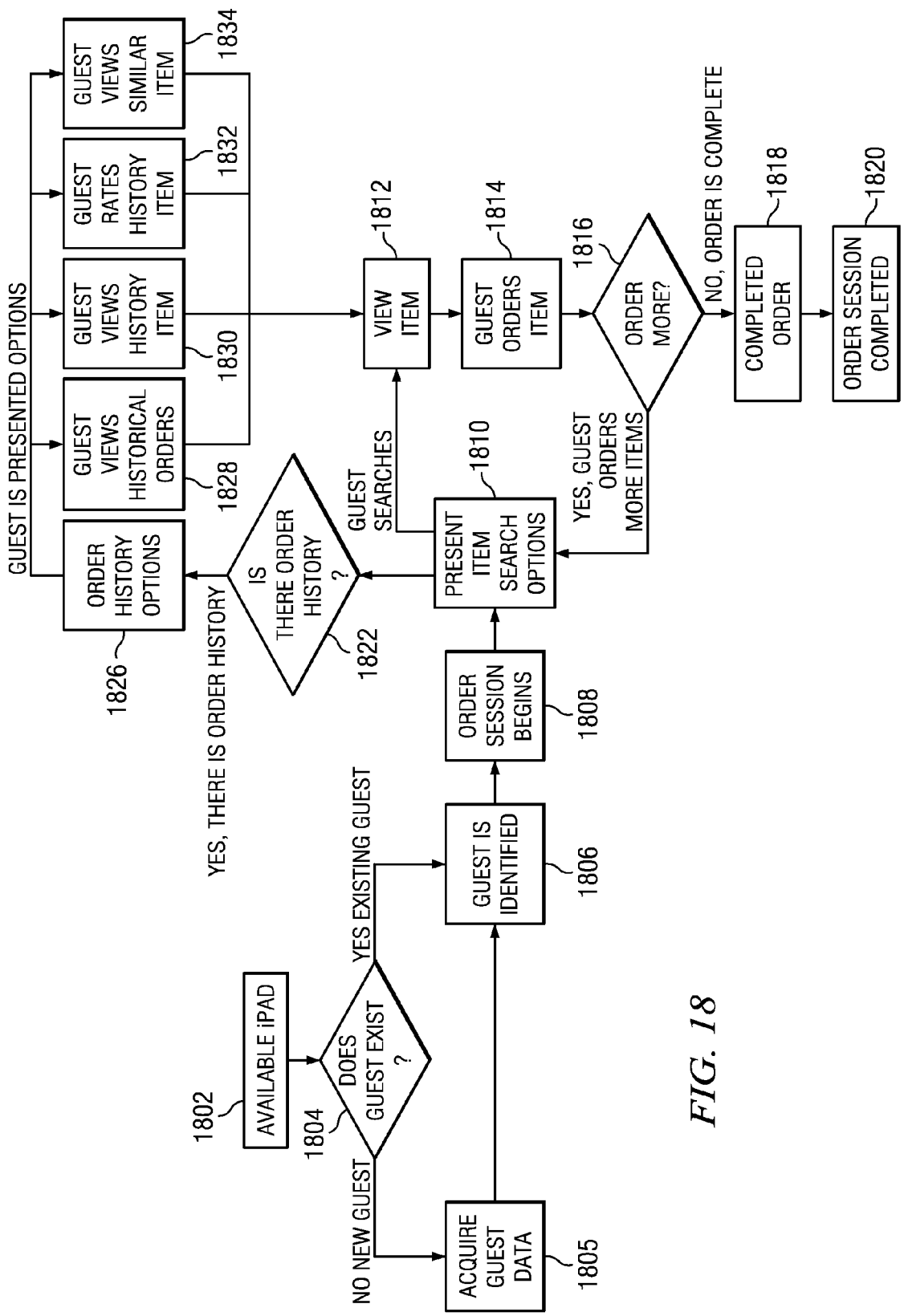
FIG. 18 illustrates a flow chart depicting the operation of providing the choices to the patron.

Referring now to FIG. 18, there is illustrated a flow chart for the overall operation of providing a personal experience to a user. The program is initiated at a block 1802 to determine if an available tablet is present. If so, the program flows to a function block 1804 to determine if a particular guest exists within the particular local or global database. If the guest does not exist in the local or global database, the program flows to a function block 1806 to acquire the guest data and, if the guest already exists in the database the program flows to a function block 1806 wherein the guest is identified, which is also the flow for function block 1806. Once the guest is identified, the program flows to a function block 1808 to initiate the order session. After the order session is initiated, the program flows to a function block 1810 to present the various search options to a particular patron. As noted hereinabove with respect to FIG. 17, the guest could merely search available items on the menu and proceed along a path to a function block 1812, this being a basic search operation to view various items. The program will then flow to function block 1814 wherein a guest will order a particular item and then to a function block 1816 to determine if the guest wants to order other items. If so, the program flows from the decision block 1816 back to the function block 1810. If not, the order is complete and the program flows along a path to a function block 1818 to complete the order and then to a function block 1820 where the order session is completed.

If, at the function block 1810, the patron chose the personalized path, the program flows from the function block 1810 to a decision block 1822 in order to determine if there is an order history. If so, the decision will then flow along a "Y" path to a function block 1826 in order to present to the patron or guest various order history options. With respect to a particular patron or guest that has been identified with respect to the particular tablet, the patron or guest is presented the various options at this point. One option is that the patron or guest is allowed to view historical orders, as defined in a function block 1828. This will allow the patron or guest to view the historical orders at that restaurant, at restaurants in a particular chain, at restaurants anywhere in the world, etc. This is a feature that can be restricted by a particular client (restaurant owner) operating the overall system. It may be that a particular client, the restaurant owner, desires not to extend the personal experience beyond their chain of restaurants. However, since the global database 1518 maintains the history of a particular identified patron or guest over all restaurants in the system, it is possible that not all personal experiences will be extended to all restaurants on any particular tablet at a given establishment.

In addition to their personal history, the user is allowed to view particular history items, i.e., they can actually select the particular wine that they had a personal experience with at that restaurant or another restaurant in the chain and view their rating of that wine at a previous time, their notes, etc. as set forth in a function block 1830. It may be that if the guest had ordered this wine at a previous time but, at the time of ordering, there was no rating provided by the guest due to the fact that no opportunity was provided to the patron prior to the completion of their dining experience. In this event, a later viewing of that item allows the patron to rate their experience with that particular wine at a function block 1832. In addition to viewing that particular item, they can also view similar items with a similar flavor profile, as set forth in a function block 1834. After viewing all of the items, as defined by the function block 1812, the guest can then order an item and proceed to the function block 1814. Thus, by either choosing a personalized experience along one path or merely just searching the database in the manner set forth hereinabove, the user is presented with multiple options to select their wine.

Referring now to FIG. 19, there is illustrated a flow chart depicting the operation of acquiring the patron or guest data. The program is initiated at a decision block 1902 in order to determine if the guest data is present locally, i.e., in the local database 1514. If so, the program flows along the "Y" path to a decision block 1904 in order to determine if a synchronization operation is to be performed upon logging into the system. This synchronization operation allows the local server to synchronize with the global server. If not, the program flows along an "N" path to a function block 1906 wherein the patron or guest is identified. However, if a synchronization is performed at this point in time, the program flows along a "Y" path to perform the synchronization with a global database and then flows to a function block 1908 wherein the profile information for the patron or guest is now synchronized at the local level and then proceeds to the function block 1906.

If, at decision block 1902, it is determined that the patron or guest does not exist within the local database 1512, the program will then flow along a "N" path to a decision block 1914 in order to determine if the profile information for the patron or guest profile in the global database 1518. If so, the program would flow along a "Y" path from the decision block 1914 to the function block 1908 to indicate that the profile information for the patron or guest data is now synched locally. This process will allow the patron or guest profile data stored in the global database 1518 to now be stored locally for use by the patron or guest. However, it should be understood that all communications can be done directly with the global server 1516.

If the patron or guest profile data is not found in the global database 1518, this indicates that this is a new previously unregistered patron or guest. At this point, the program will then flow along the "N" path to a function block 1918 in order to enter the patron or guest profile data manually. This is a function performed by a receptionist. The program the flows to a function block 1920 in order to create this patron or guest profile data on a global basis at the global database 1518 and then flows to a function block 1922 wherein the patron or guest profile data is also synchronized locally.

Referring now to FIG. 20, there is illustrated a flow chart for one aspect of entering patron or guest profile data upon the guest or patron entering the restaurant. There are many ways for profile data for a patron or guest to be entered into the system. One aspect that could be present is that a guest might have a unique ID. A unique ID is some mechanism associated with that patron or guest. It could be a restaurant "Reward" card that the patron or guest was provided at some time during a previous visit to that restaurant or a restaurant in the chain. It could be a code provided in a smart phone or even on some type of smart card or even some code associated with an application that runs along a smart phone. If no unique code is present, then the program will flow along a "N" path to a decision block 2002 and then to a function block 2004 in order to enter the data in a keyboard in a manual operation. However, if there is a unique ID associated with a patron or guest, the program will flow from the decision block 2000 along a "Y" path to select one of multiple options. One could be a peer-to-peer function block 2006 which indicates that a particular communication path links two devices directly. This could be a smart phone operating with a local 802.15.4 transceiver from one smart phone or computer to the actual tablet, which would allow the tablet 1504 to recognize a particular smart phone and extract therefrom and ID. This ID could be utilized to access patron or guest profile information. Additionally, however, it is possible that an application running on a particular device having such peer-to-peer capabilities could actually access the patron or guest profile and download that profile to a particular tablet in the event such profile were not present in the local database. This, of course, is a function of a particular application that may be provided to a particular patron or guest on a given smart phone. Another technique to identify a particular patron or guest with a unique ID is use of near field technology, as indicated by a function block 2008. This near field technology allows a device such as a smart phone to be brought into close proximity to the tablet or some type of reader in order to extract a unique ID therefrom. Additionally, the patron or guest could utilize their smart phone in a manner to basically connect via a cell tower to the local server or the global server in order to effect the transfer of a user ID or unique ID to the tablet. This is indicated in a function block 2010. Once either the information is entered by keyboard or it is extracted from a unique ID, the program flows to a block 2012.

Figure 21:
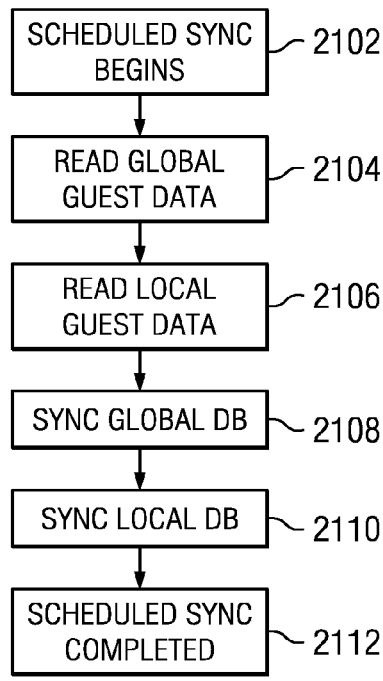
FIG. 21 illustrates a flow chart for depicting the sync schedule.

Referring now to FIG. 21, there is illustrated a flow chart depicting the operation of scheduling a time at which the profile data for a particular guest or patron is synchronized between the global and local servers. This is initiated at a function block 2102 and then the program proceeds to a function block 2104 to read the global patron or guest profile data and then to function block 2106 to read the local patron or guest profile data. The two databases are synchronized at a block 2108 when differences exist, i.e., there are updates at the local database, for example, that need to be reflected in the global database or there are changes in the global database that need to be updated in the local database. For example, there may be three restaurants in a chain with local servers and a patron or guest dining at one restaurant may update their experiences or order history locally at that restaurant which must then be reflected at the global database and then transferred back down to the local servers of other restaurants in a particular chain that may desire to reflect data for a given patron or guest in that system. The program then flows to a function block 2110 to synchronize the local databases and then to a function block 2112 wherein the scheduled synchronization is complete.

Figure 22:
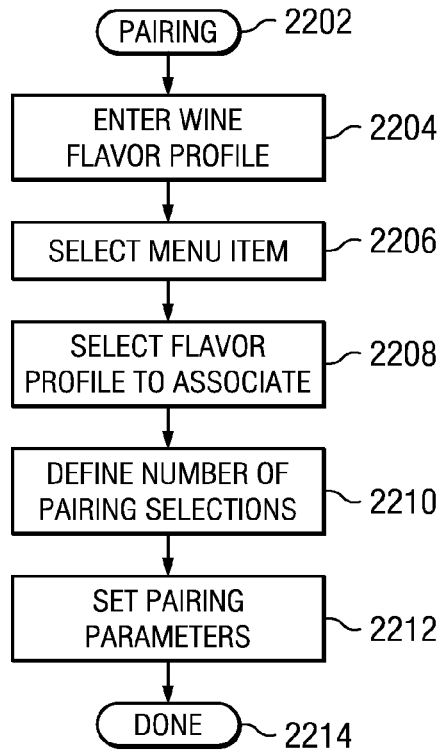
FIG. 22 illustrates a flow chart for the operating of pairing.
Figure 23:
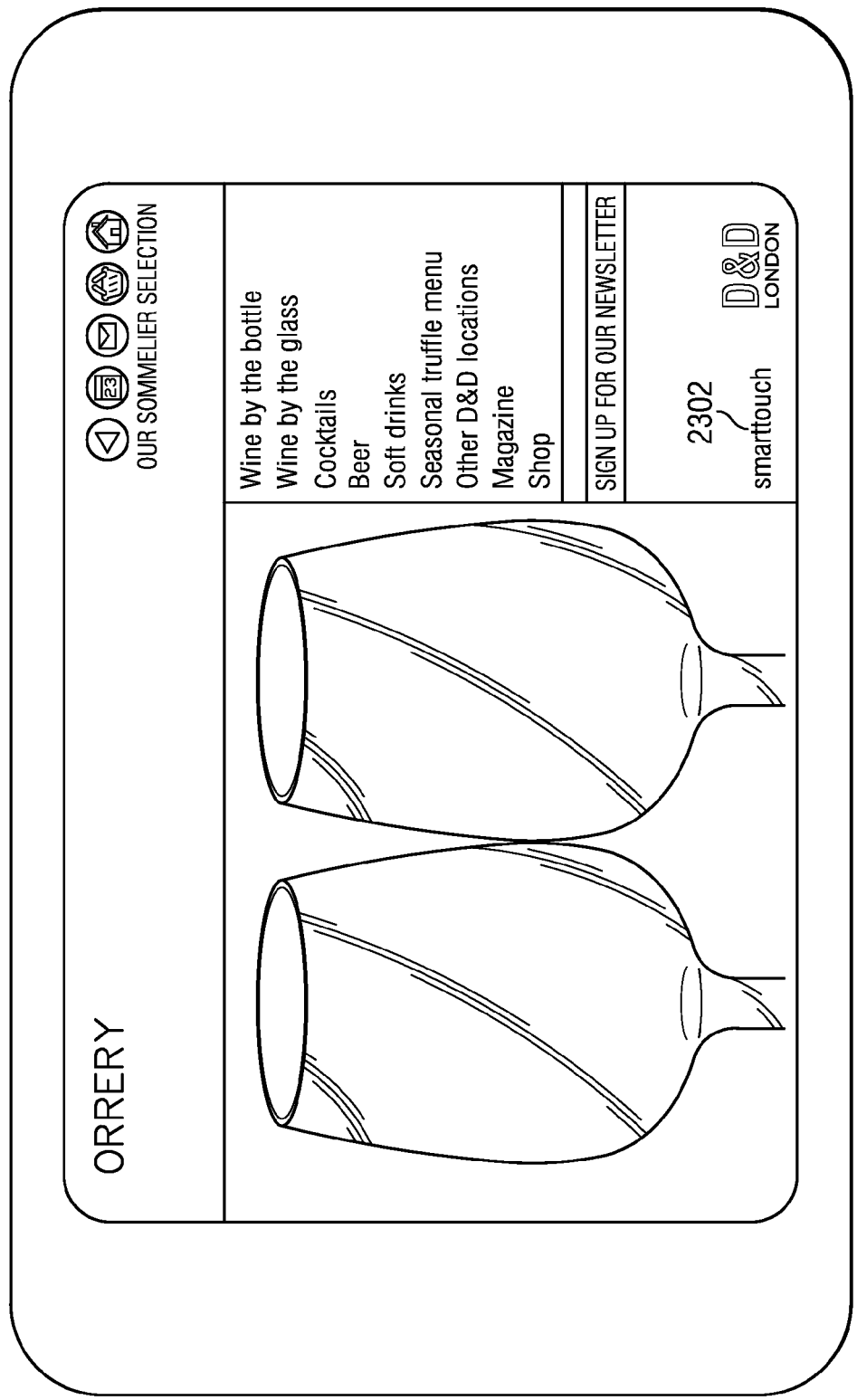
Figure 24:
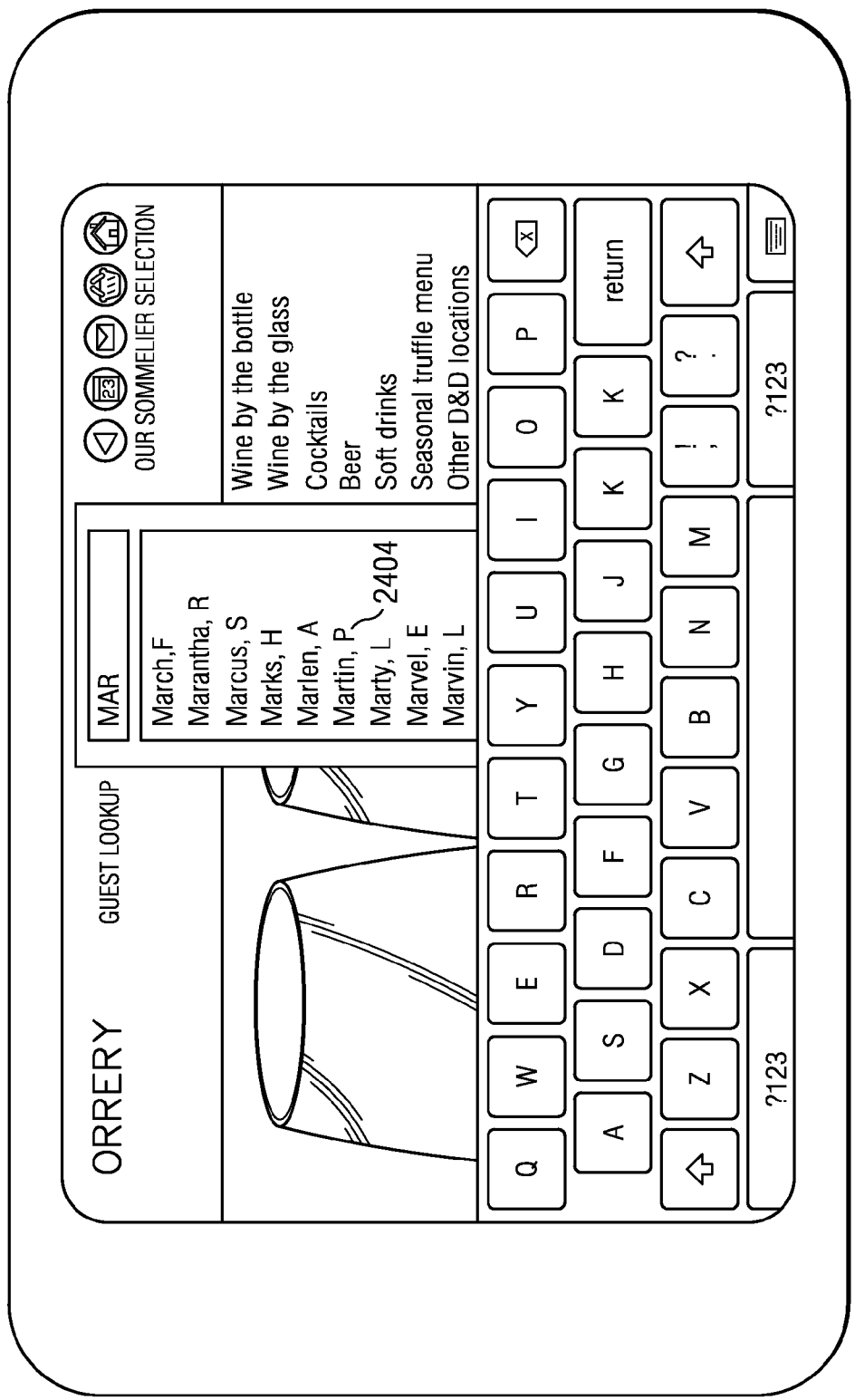

Referring now to FIG. 22, there is illustrated a flow chart for the general set-up in a pairing operation, which is initiated at a block 2202. The sommelier, as described hereinabove, is provided the task of ensuring that wines be entered into the database for a given wine cellar to indicate the type of wine that is present and the quantity thereof. Other attributes of the wine can be provided such as a flavor profile, how they wish to be presented to the patron, etc. For pairing, a sommelier may pick a particular menu item and desire to indicate to a particular patron or to patrons in general the flavor profile of wine that, in their opinion, would be an acceptable wine to enjoy with a particular menu item. By selecting the flavor profile, multiple wines in the inventory could be paired. The sommelier may provide a rating for the pairing operation such that certain wines are rated higher for the pairing versus others such that, if the sommelier desires only three wines to be provided as choices to patrons of the restaurant receiving the menu, only the highest rated wines in that choice will be selected. If three wines were selected, for example, for pairing out of ten possible choices, only the highest rated three would be selected.

Referring further to the flow chart of FIG. 22, the program will flow from the block 2202 to a function block 2204 to enter the wine flavor profile for a given wine into the database and then to the function block 2206 to select a various menu items for pairing. The function block 2204 is a basic set-up for a wine list in general. The program then flows from function block 2206 to function block 2208 in order to select a flavor profile to associate with a particular menu item. By defining this flavor profile, the wines that fit this flavor profile in the inventory will be associated therewith. The program then flows to function block 2210 in order to find the number of pairing selections that will be presented to patrons of a restaurant. Rather than providing all of the wines that fit the flavor profile associated with the select menu items, a sommelier may restrict this to one, two or three wine selections. The program then flows to a function block 2212 in order to set the pairing parameters. These are parameters that define ratings of wine such that some wines are rated higher than others. It is important to note that the sommelier may actually bias these ratings such that certain wines that he has an adequate supply of are more highly suggested than other wines. Additionally, the sommelier may have some wines that he does not want presented to the general patrons of the restaurant for any number of reasons. These will be restricted from the list by way of example. After the pairing parameters are set in function block 2212, the program flows to a block 2214.

FIGS. 23-27, there are illustrated screen shots for the operation of the tablet 1504. With specific reference to FIG. 23, there is illustrated a greeting page for the tablet 1504 when turned on. This will initially go to a home page for the restaurant illustrating various choices. This particular tablet is set forth to only provide access to wines, cocktails, beer and various other drinks in addition to specialty items. There is access to online magazines and shopping locations also. The next page in the operation is illustrated in FIG. 20 which is accessed by pushing or touching the region 2302 on the tablet face of FIG. 23. This brings up a smart keyboard to allow information to be entered by a particular user. This could be accessed by the receptionist or actually the patron or guest when they receive the tablet. A selection 2404 can be made for a particular patron, this being the operation wherein it was determined that the patron existed in either the local or the global database. As described hereinabove, the system would look in the local database first to determine the patron or guest is in the local database. If the patron or guest were not in the local database, the patron's or guest's name would be entered and the system would look at the global database to determine if the patron or guest was in that global database and, if not, then the information would be entered either via a receptionist entering the data or the patrons themselves entering the data.

Figure 25:
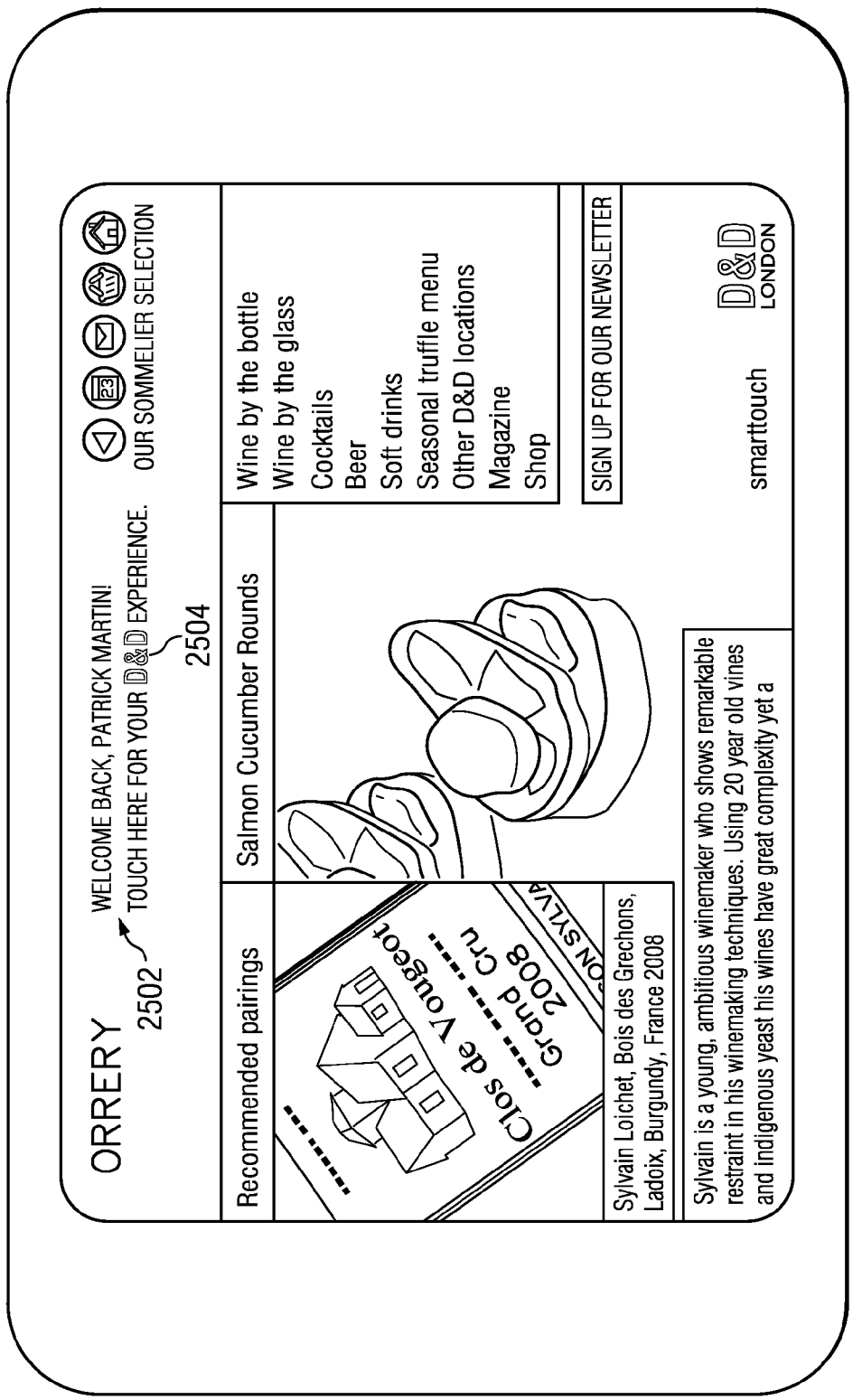

The next page is that illustrated in FIG. 25, wherein a welcome message in area 2502 is presented to the patron or guest welcoming them back by name. The user can touch the screen at any particular location, such as location 2504 in order to actually go to their personal experience, as set forth hereinabove with respect to FIG. 17. If selected, the next page displayed would be that illustrated in FIG. 26. In this illustration, there are provided multiple columns, one for the date of a particular visit to a particular restaurant, the name of the restaurant, the wine that was actually selected at that particular restaurant, a rating provided by the patron or guest and information as to whether that particular wine is in stock. The list of restaurants in the restaurant column can be all restaurants in the global database that the patron or guest has visited in the past or it could be restricted by the particular client running the system for only the history of the patron or guest in that restaurant, or it could provide the history of that patron or guest in restaurants in a chain. This can be customized on a case-by-case basis. The particular way in which a particular wine is displayed is a choice of a sommelier. This can be very detailed description or it can be a very succinct description. The ratings are actual ratings by the patron or guest that reflect their experience with that particular wine at that associated restaurant. The indication of whether it is in stock indicates if that particular wine is in stock at that restaurant.

Just because it is listed does not mean that it was ever in stock at the restaurant. If it is indicated that it is not in stock at the restaurant, that just indicates that particular fact. Thus, even though a particular patron or guest had a personal experience with a particular wine at another restaurant in the system, this information just allowed them to gain knowledge of the fact that, even though they had that experience, the wine is not available at this particular restaurant or any particular wine cellar at that time. The last column is information regarding their desire to order such a wine. If the wine is in stock and they had a particular experience with that particular wine, they are provided the ability to order that wine. Of course, if their experience was a bad experience for any reason, they may want to select another wine. Additionally, even though the wine is in stock, the patron may wish to see a wine that has a similar flavor profile. Thus, the patron is allowed to see wines with similar flavor profiles. In the event that a wine is not in stock either because it was never part of the wine cellar (the patron or guest had a personal experience with this wine at another restaurant in the chain), it has been discontinued or it is just temporarily out of stock, the patron or guest is provided the ability to view wines with similar flavor profiles. As such, what this allows the patron or guest to do is gain access to actual prior history for a particular flavor profile associated with that particular restaurant or restaurant chain as experienced by that patron or guest and see wines with a similar profile in that particular restaurant. It can be seen that for negative ratings (wherein the rating is illustrated being negative as, for example, the rating 2602 for the 2009 sauvignon blanc), there is provided the ability to recommend some other wine other than that particular wine since the experience was a negative experience.

Figure 27:
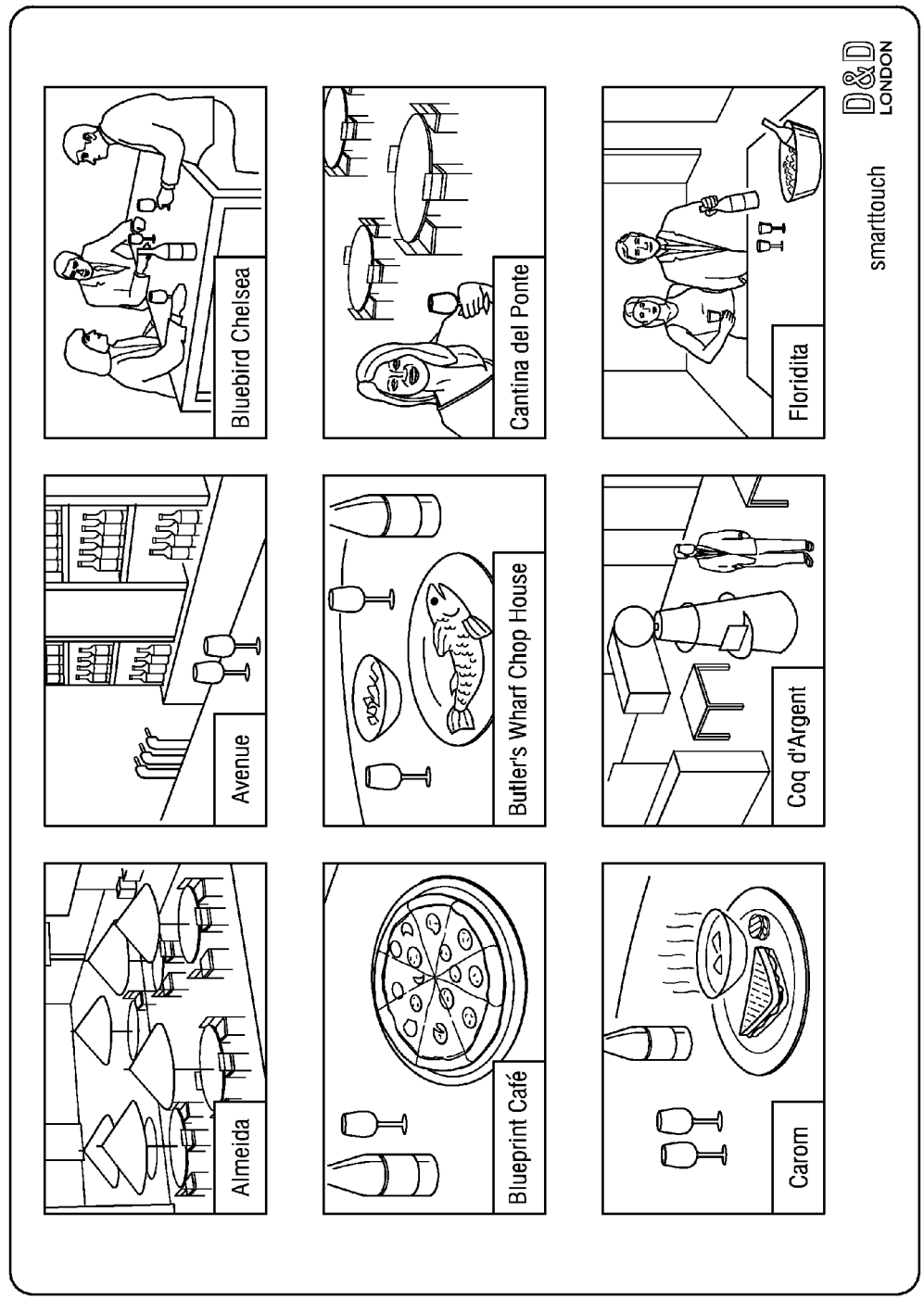

The patrons are also provided with the ability to view other locations within the particular restaurant chain, as illustrated in FIG. 27, which is selected by touching the area 2604 to select other locations. This then brings up the page of FIG. 27 and these locations can be viewed.

Figure 28:
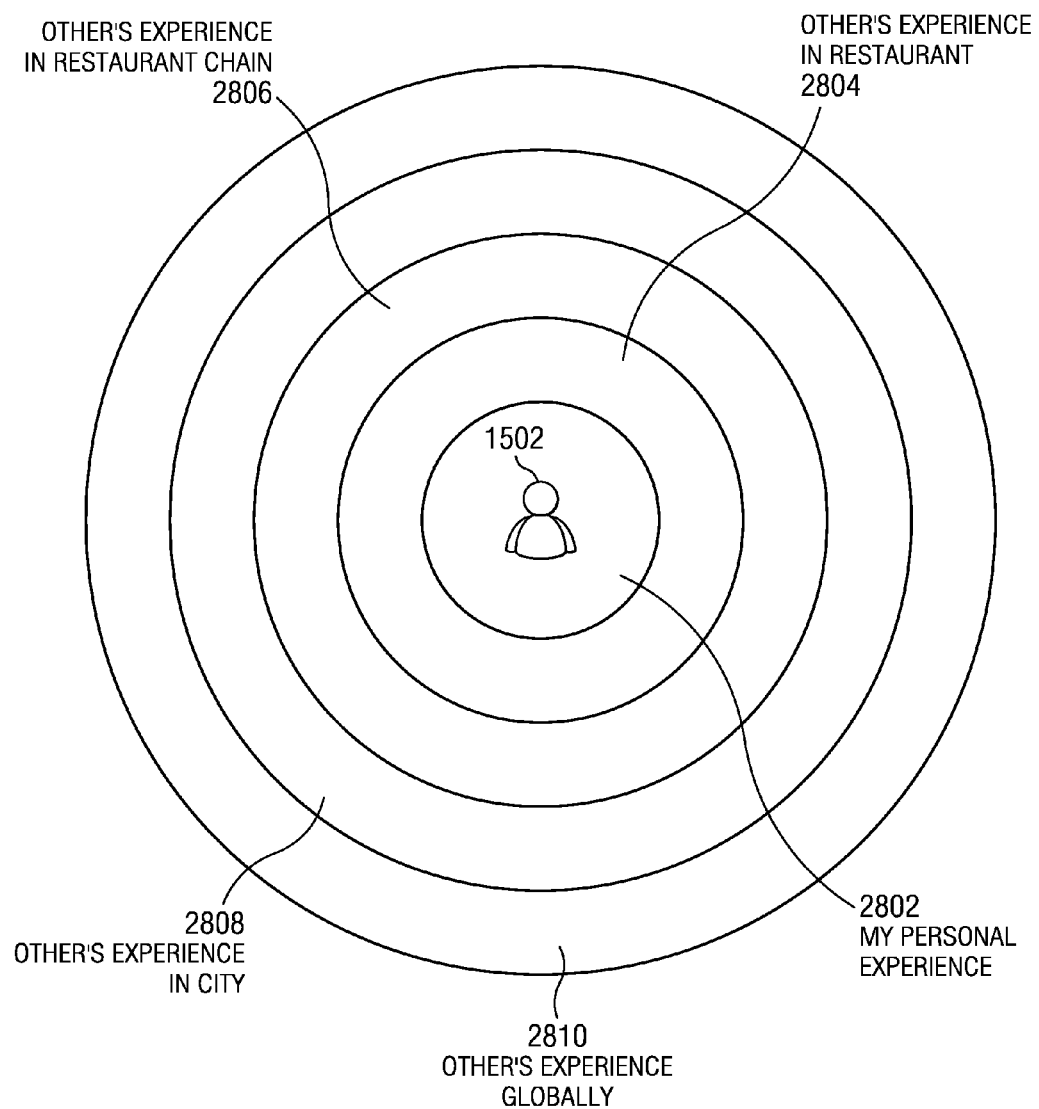
FIG. 28 illustrates a diagrammatic view of the multiple layers of personal experience that a user is provided.

Referring now to FIG. 28, there is illustrated a diagrammatic view of how a particular patron can be presented with different levels of experience. The first level, a level 2802 is provided to patron 1502 which is that particular patron's experience at that restaurant. This personal experience may be at that particular restaurant or restaurants in the chain. However, it is the user's personal experience with respect to that particular restaurant and with that particular wine that is provided to the patron or guest in the first level of experience. The other level of experience can be with respect to others that have actually dined in the restaurant and tried different wines. That would be at level 2804. The next level, a level 2806 is a level where one would determine the experience of others in a particular restaurant chain. The quality of any particular restaurant's wine cellar, care of the wine in the wine cellar, and the way they present the wine to the patrons can be important to a particular patron or guest. The next level is level 2808 which is basically a higher level and indicates others' experience in a particular city. It would possibly be important, for example, to gain some information of other patrons of restaurants in a particular city such as London that might be useful to a particular patron. These are actual experiences of patrons in restaurants that have ordered and tasted certain wines. As such, an experience of a person that actually dined in a restaurant within the city and had selected a wine with a similar flavor profile to that which the current patron or guest is interested in may be of use to that patron or guest. The next level is a level 2810 which is the global database wherein the experience of other patrons in the particular global database can be viewed. Again, these are actual experiences in restaurants with respect to a particular wine, either that exact wine that the patron or guest is interested in, or a similar vintage or a similar flavor profile. This is not a generic tasting or rating by a professional taster, but, rather, an actual other patrons' experience with that particular wine.

It will be appreciated by those skilled in the art having the benefit of this disclosure that this system and method to enable a restaurant patron to select a wine based upon available inventory provides a convenient, patron-friendly means and method of making a wine selection from wines in the restaurant inventory. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A method of serving a patron of a food services establishment a wine, comprising the steps of:
    providing a handheld device connected to a central server to a patron upon the patron entering the establishment and personalizing the handheld device to the patron at the central server such that the central server identifies the patron and recognizes activity of the patron on the handheld device;
    accessing, at the central server, personal experiences of the patron representing their prior actual experiences with wine selections and presenting such, via the handheld device, to the patron, the prior actual experiences evidenced by a rating provided by that patron based on their actual prior selection of an associated wine at that establishment with a prior use of the handheld device for recording such;
    selecting by the patron, via the handheld device, one or more wines with or without other available services from the food establishment;
    if the selected wine is not available at the food service establishment, accessing, with the central server, a database including the flavor profiles of a plurality of wines;
    identifying, with the central server, the flavor profile of the selected wine;
    comparing, with the central server, the flavor profile of the selected wine with the flavor profiles of wines available at the food service establishment and identifying one or more alternate wines having the same or similar flavor profiles;
    accessing, with the central server, a database including the actual experiences of other patrons with the identified alternate wines at the food services establishment, evidenced by ratings provided by other patrons that have used the handheld device at that establishment and recorded with the handheld device their experiences with the identified one or more alternate wines;
    presenting, with the hand held device, the identified alternate wines along with the rating provided by the other patrons, of the alternate wines, to the patron;
    selecting by the patron, via the handheld device, one or more of the identified alternate identified wines with or without other available services from the food establishment.

2. The method of claim 1, wherein the step of personalizing further comprises identifying the patron such that the patron is associated with the handheld device provided thereto and with the operation thereof.

3. The method of claim 2, further comprising receiving, with the hand held device, a unique identifier associated with the patron and accessing, with the central server, profile information of the patron.

4. The method of claim 1 further comprising creating a database, accessible with the central server of wines and the associated flavor profiles of the wines.

5. The method of claim 1 further comprising receiving, with the central server, the patron's selection and serving the selected wine to the patron.

6. The method of claim 1, further comprising the steps of:
    accessing prior rated wine selections at an establishment related to the current establishment and which related establishment and current establishment are related by common management;

presenting to the patron the option of extending the step of presenting the personal experiences of the patron to prior rated wine selections from the related establishment; and upon exercising the option by the patron, then presenting the prior rated wine selection including that associated with the related establishment.

7. The method of claim 1, and further comprising the steps of:

accessing prior rated wine selections on a global basis for all food establishments; and presenting to the given patron the option of extending the step of presenting the personal experiences of the given patron to prior rated wine selections from all establishments; and upon exercising the option by the given patron, then presenting the prior rated wine selections including that associated with the global establishments.

8. A method of serving a patron of a food services establishment a wine, comprising the steps of:

providing a handheld device to a patron upon the patron entering the establishment for the purpose of accessing food services thereof and connecting the handheld device to a central server;

personalizing the handheld device to the patron at the central server such that the central server identifies the patron and recognizes activity of the patron on the handheld device;

accessing at the central server personal experiences of the patron representing their prior actual experiences with wine selections and presenting such, via the handheld device, to the patron, the prior actual experiences evidenced by a rating provided by that patron based on their actual prior selection of an associated wine at that establishment with a prior use of the handheld device for recording such;

selecting by the patron, via the handheld device, one or more wines with or without other available services from the food establishment;

if the selected wine is not available at the food service establishment, accessing, with the central server, a database including the flavor profiles of a plurality of wines;

identifying, with the central server, the flavor profile of the selected wine;

comparing, with the central server, the flavor profile of the selected wine with the flavor profiles of wines available at the food service establishment and identifying one or more alternate wines having the same or similar flavor profiles;

accessing, with the central server, a global database including the actual experiences of other patrons with the identified alternate wines, evidenced by ratings provided by the persons that have used the handheld device and recorded with the handheld device their experiences with the identified one or more alternate wines;

presenting, with the hand held device, the identified alternate wines along with the rating provided by the other patrons of the alternate wines, to the patron; and selecting by the patron, via the handheld device, one or more of the alternate identified wines with or without other available services from the food establishment.

9. The method of claim 8, further comprising the steps of:

providing to the patron the ability, via the handheld device, to rate a previously selected and unrated wine selection at that food establishment; and storing the then current wine selections and ratings at the central server as a history of the current wine selection whether associated with a prior actual experience or not.

10. The method of claim 8 further comprising creating a database, accessible with the central server of wines and the associated flavor profiles of the wines.

11. The method of claim 8, wherein the step of personalizing further comprises identifying the patron such that the patron is associated with the handheld device provided thereto and with the operation thereof.

12. The method of claim 11, further comprising receiving, with the hand held device, a unique identifier associated with the patron and accessing, with the central server, profile information of the patron.

13. The method of claim 8 further comprising creating a database, accessible with the central server, of wines and the associated flavor profiles of the wines.

14. The method of claim 8 further comprising receiving, with the central server, the patron's selection and serving the selected wine to the patron.

15. The method of claim 8, further comprising the steps of:

accessing prior rated wine selections at an establishment related to the current establishment and which related establishment and current establishment are related by common management;

presenting to the patron the option of extending the step of presenting the personal experiences of the patron to prior rated wine selections from the related establishment; and upon exercising the option by the patron, then presenting the prior rated wine selection including that associated with the related establishment.

\* \* \* \* \*